US012748965B2

(12) United States Patent
Le et al.

(10) Patent No.: US 12,748,965 B2
(45) Date of Patent: Sep. 29, 2026

(54) WILDFIRE IGNITION PREDICTION WITH SWARM NEURAL NETWORK ENSEMBLE

(71) Applicant: Our Kettle Inc., Kensington, CA (US)

(72) Inventors: Son Le, New York, NY (US); Andrew Engler, Pittsford, NY (US); Nathaniel Manning, Kensington, CA (US)

(73) Assignee: Our Kettle, Inc., Lemoore, CA (US)

( * ) Notice: Subject to any disclaimer, the term of this patent is extended or adjusted under 35 U.S.C. 154(b) by 1230 days.

(21) Appl. No.: 17/456,486

(22) Filed: Nov. 24, 2021

(65) Prior Publication Data

US 2022/0383102 A1 Dec. 1, 2022

Related U.S. Application Data

(60) Provisional application No. 63/117,905, filed on Nov. 24, 2020.

(51) Int. Cl.
*G06N 3/08* (2023.01)

(52) U.S. Cl.
CPC .................................... *G06N 3/08* (2013.01)

(58) Field of Classification Search
CPC ........ G06N 3/08; G06N 3/044; G06N 3/0464; G06N 3/006; G06N 3/045; G06N 3/048
See application file for complete search history.

(56) References Cited

U.S. PATENT DOCUMENTS

2018/0336460 A1* 11/2018 Tschemezki ........... G06N 3/045
2021/0271934 A1* 9/2021 White .................... G06N 3/045

OTHER PUBLICATIONS

Zoph, Barret, and Quoc V. Le. “Neural architecture search with reinforcement learning.” arXiv preprint arXiv:1611.01578 (2017). (Year: 2017).*

Fielding, Ben, and Li Zhang. “Evolving deep DenseBlock architecture ensembles for image classification.” Electronics 9.11 (2020): 1880. (Year: 2020).*

Scardapane, Simone, Giovanni Trovini, and Sandeep Reddy Sabbella. “Fire and Smoke Detection for Smart Cities Using Deep Neural Networks and Edge Computing on Embedded Sensors.” (2020) (Year: 2020).*

Yadav, Ashima, and Dinesh Kumar Vishwakarma. “A deep learning architecture of RA-DLNet for visual sentiment analysis.” Multimedia Systems 26.4 (2020): 431-451. (Year: 2020).*

* cited by examiner

*Primary Examiner* — David Yi
(74) *Attorney, Agent, or Firm* — Butzel Long

(57) ABSTRACT

Various embodiments analyze the application of satellite imaging and deep learning in predicting ignition and spread of major wildfires. The training data comes from NASA satellite products and historical records of wildfires in the United States. A state-of-the-art technique in neural network image classification may be utilized and yield impressive results for wildfire ignition prediction. In one embodiment, the model may achieve an accuracy rate of 93.5%, a precision rate of 93.2%, a recall rate of 88.9%, and an F-1 score of 90.8%. Direct applications of the model may include wildfire monitoring and wildfire prevention.

18 Claims, 30 Drawing Sheets

OLS Regression Results

| | | | |
|---|---|---|---|
| Dep. Variable: | FIRE_SIZE | R-squared: | 0.716 |
| Model: | OLS | Adj. R-squared: | 0.704 |
| Method: | Least Squares | F-statistic: | 56.18 |
| Date: | Thu, 25 Jun 2020 | Prob (F-statistic): | 6.86e-66 |
| Time: | 01:50:20 | Log-Likelihood: | -4020.6 |
| No. Observations: | 280 | AIC: | 8067. |
| Df Residuals: | 267 | BIC: | 8114. |
| Df Model: | 12 | | |
| Covariance Type: | nonrobust | | |

| | coef | std err | t | P>\|t\| | [0.025 | 0.975] |
|---|---|---|---|---|---|---|
| count | 1.471e+04 | 850.953 | 17.283 | 0.000 | 1.3e+04 | 1.64e+04 |
| Jan | -1.099e+05 | 9.83e+04 | -1.118 | 0.265 | -3.03e+05 | 8.37e+04 |
| Feb | -1.318e+05 | 8.79e+04 | -1.498 | 0.135 | -3.05e+05 | 4.14e+04 |
| March | -2.172e+05 | 8.97e+04 | -2.421 | 0.016 | -3.94e+05 | -4.06e+04 |
| April | -2.012e+05 | 9.08e+04 | -2.215 | 0.028 | -3.8e+05 | -2.24e+04 |
| May | -9.34e+04 | 9.09e+04 | -1.027 | 0.305 | -2.72e+05 | 8.56e+04 |
| June | 1.89e+05 | 1.11e+05 | 1.708 | 0.089 | -2.89e+04 | 4.07e+05 |
| July | -2.855e+05 | 1.26e+05 | -2.273 | 0.024 | -5.33e+05 | -3.82e+04 |
| Aug | -4.373e+05 | 1.24e+05 | -3.520 | 0.001 | -6.82e+05 | -1.93e+05 |
| Sep | -2.534e+05 | 9.1e+04 | -2.786 | 0.006 | -4.33e+05 | -7.44e+04 |
| Oct | -1.013e+05 | 8.81e+04 | -1.150 | 0.251 | -2.75e+05 | 7.21e+04 |
| Nov | -1.487e+05 | 8.78e+04 | -1.694 | 0.091 | -3.22e+05 | 2.41e+04 |
| Dec | -5.63e+04 | 9.32e+04 | -0.604 | 0.546 | -2.4e+05 | 1.27e+05 |

| | | | |
|---|---|---|---|
| Omnibus: | 257.596 | Durbin-Watson: | 1.531 |
| Prob(Omnibus): | 0.000 | Jarque-Bera (JB): | 10645.491 |
| Skew: | 3.458 | Prob(JB): | 0.00 |
| Kurtosis: | 32.405 | Cond. No. | 422. |

FIG. 1E

```
Algorithm 1: Frequency-based wildfire simulation scheme
Input: n number of simulation, bgs big grid size, sgs small grid size
Split the U.S. into m grids of size bgs;
Split each bg into sg of size sgs;
Initiate bgm for a mapping of big grid statistics;
foreach bg in bgm do
    bgm[bg][m][p] = rate of wildfire of bg in month m;
    bgm[bg][m][size] = mean spread size of wildfire in bg in month m;
    bgm[bg][m][wind] = wind data in bg in month m;
    foreach sg in bg do
        Interpolate p for sg at each bg corners;
        Interpolate p for each sg in bg ;
        Normalize each p by ∑_{i=1}^{N} p_i ;
        bgm[bg][m][sg] = p;
    end
end
for i = 0 to n do
    foreach month do
        m = Total number of wildfires from sampling;
        s = Total burn size from regression model prediction;
        while m > 0 and s > 0 do
            Select ignition big grid by generating a random number from
              a uniform distribution from 0 − 1;
            Select ignition point by generating a random number from a
              uniform distribution from 0 − 1;
            Sample a size from bgm[bg][m][size];
            Sample wind data from bgm[bg][m][wind];
            Use sampled size and wind data to create a wildfire spread;
            Record affected area for risk estimation;
            m = m − 1;
            s = s−sampled wildfire size;
        end
    end
end
Output: Set of wildfire occurrence
```

FIG. 1G

Algorithm 2: Frequency-based simulation scheme with forecast

```
Input: n number of simulation, bgs big grid size, sgs small grid size
Initialization and setting up grid system similar to Algorithm 1;
for i = 0 to n do
    foreach month do
        m = Total number of wildfires from forecast interval;
        m_c = A copy of m;
        s = Total burn size from regression model prediction;
        while m > 0 and s > 0 do
            Select ignition big grid by generating a random number from
             a uniform distribution from 0 - 1;
            Select ignition point by generating a random number from a
             uniform distribution from 0 - 1;
            Sample a size from bgm[bg][m][size];
            Sample wind data from bgm[bg][m][wind];
            Use sampled size and wind data to create a wildfire spread;
            Record affected area for risk estimation;
            m = m - 1;
            s = s-sampled wildfire size;
        end
        Add m_c - m to data to forecast next month.
    end
end
Output: Set of wildfire occurrence
```

FIG. 1I

| Component | Name | Description |
|---|---|---|
| $R$ | Rate of spread (ft/min) | Flaming front of a surface fire |
| $I_R$ | Reaction intensity (Btu/ft$^2$/min) | Energy release rate per unit area of fire front |
| $\xi$ | Propagating flux ratio | Proportion of the reaction intensity that heats adjacent fuel particles to ignition (no wind) |
| $\phi_w$ | Wind factor | Dimensionless multiplier that accounts for the effect of wind in increasing the propagating flux ratio |
| $\phi_s$ | Slope factor | Dimensionless multiplier that accounts for the effect of slope in increasing the propagating flux ratio |
| $\rho_b$ | Bulk density (lb/ft$^3$) | Amount of oven-dry fuel per cubic foot of fuel bed |
| $\epsilon$ | Effective heating number | Proportion of a fuel particle that is heated to ignition temperature at the time flaming combustion starts |
| $Q_{ig}$ | Heat of preignition (Btu/lb) | Amount of heat required to ignite one pound of fuel |
| $I_R\xi$ | No-wind, no-slope propagating flux (Btu/ft$^2$/min) | Heat release rate from a fire to the fuel ahead of the fire, without wind or slope |
| $(1 + \phi_w + \phi_s)$ | | Increase to the no-wind, no-slope propagating flux due to wind and slope |
| $I_R\xi(1 + \phi_w + \phi_s)$ | Heat source (Btu/ft$^2$/min) | Propagating flux |
| $\rho_b \epsilon Q_{ig}$ | Heat sink (Btu/ft$^3$) | Heat required to ignite the fuel |

FIG. 1J

```
Algorithm 3: Simulation with Rothermel model & Huygen's principles
Input: Ignition location; Rothermel model parameter data;
Initialize first wildfire vertex;
Initialize fire front vertex list;
Initialize fire end flag;
Initialize wildfire spread area;
Initialize time;
Extract data at fire front;
Calculate first ellipse of spread;
while fire has not ended do
    time+=1;
    Calculate weather conditions at wildfire front;
    foreach fire front fire vertex do
        Extract Rothermel model parameter data at vertex;
        Calculate Huygen's principle parameters and differentials;
        Add new fire front fire vertex;
        Remove old fire front fire vertex;
        Add non-overlapped elliptical spread to wildfire spread area;
        Adjust fuel moisture using calculated wildfire intensity;
    end
    if fire front vertex list is empty then
        Set fire end flag to true;
end
Output: Wildfire spread area
```

FIG. 1K

| Index | Input variable | Type | Description |
| --- | --- | --- | --- |
| FWI | Air temperature | C | °C |
| | Wind speed | C | m/s |
| | Relative humidity | C | % |
| | Rain | B | Rainfall in the last 24 h |
| FHI | Fuel models | C | Flammability index |
| | 10-h Fuel moisture content | C | % |
| | Elevation | C | m |
| | Aspect | C | ° |
| FRI | Distance to primary road network | C | m |
| | Distance to secondary road network | C | m |
| | Distance to power lines | C | m |
| | Distance to urban areas | C | m |
| | Distance to landfills | C | m |
| | Distance to recreational areas | C | m |
| | Distance to agricultural land | C | m |
| | Month | C | % of total fire ignitions |
| | Day of the week | B | Weekend or weekday |

*FWI* Fire Weather Index, *FHI* Fire Hazard Index, *FRI* Fire Risk Index, *C* continuous, *B* binary, *D* discrete

FIG. 1M

Algorithm 4: Rate of spread training

```
Input: n number of iterations
Initialize first regression model by training weather data and wildfire
  potential on rate of spread;
Train a regression model on the white noise;
for i = 0 to n do
    Select random locations;
    Obtain wildfire potential data and weather data;
    Predict rate of spread using previous regression model;
    Predict noise and add it to predicted rate of spread;
    Fit new regression models that predict rate of spread and noise;
end
Output: Rate of spread model
```

FIG. 3B

OLS Regression Results

| | | | |
|---|---|---|---|
| Dep. Variable: | Adjusted ROS | R-squared: | 0.653 |
| Model: | OLS | Adj. R-squared: | 0.653 |
| Method: | Least Squares | F-statistic: | 3404. |
| Date: | Tue, 04 Aug 2020 | Prob (F-statistic): | 0.00 |
| Time: | 20:38:24 | Log-Likelihood: | 12439. |
| No. Observations: | 7225 | AIC: | -2.487e+04 |
| Df Residuals: | 7221 | BIC: | -2.484e+04 |
| Df Model: | 4 | | |
| Covariance Type: | nonrobust | | |

| | coef | std err | t | P>\|t\| | [0.025 | 0.975] |
|---|---|---|---|---|---|---|
| Temperature | 0.0002 | 6.17e-06 | 34.962 | 0.000 | 0.000 | 0.000 |
| Wind speed | 0.0001 | 1.56e-05 | 9.546 | 0.000 | 0.000 | 0.000 |
| Precipitation | 6.435e-05 | 3.75e-05 | 1.717 | 0.086 | -9.11e-06 | 0.000 |
| Potential | 3.5890 | 1.125 | 3.191 | 0.001 | 1.384 | 5.794 |

| | | | |
|---|---|---|---|
| Omnibus: | 443.591 | Durbin-Watson: | 0.760 |
| Prob(Omnibus): | 0.000 | Jarque-Bera (JB): | 473.928 |
| Skew: | 0.595 | Prob(JB): | 1.22e-103 |
| Kurtosis: | 2.600 | Cond. No. | 5.08e+05 |

FIG. 3C

Algorithm 5: Wildfire spread algorithm

```
Input: h hours of spread, (lat,lon) location of ignition
Initialize Fire object;
Initialize first wildfire vertex at ignition;
Look up weather condition and wildfire potential at ignition location;
Predict fire-front rate of spread using regression model;
Compute flank, hank, rear, rates of spread using constant coefficients;
for i = 0 to h do
    foreach active vertex do
        if j % int(s/ROS) == 0 then
            Spread in the direction of the wind;
            Set active vertex to passive vertex;
            if spread-to vertex is new then
                Add new vertex to active vertex list;
                Look up data for the location and predict directional
                  rates of spread;
    end
    foreach passive vertex do
        if j % int(s/non-front-ROS) == 0 then
            Spread to flank/hank/rear;
            if spread-to vertex is new then
                Add new vertex to active vertex list;
                Look up data for the location and predict directional
                  rates of spread;
            if vertex finish spreading to all hank, flank, and rear then
                Add passive vertex to finished burning list;
    end
    if i % 24 == 0 then
        Update weather data and and directional rates of spread for all
          active vertices;
end
Output: Wildfire spread simulation
```

FIG. 3D

Algorithm 6: Kettle wildfire risk estimation system

```
Input: n number of simulation, a big grid and a small grid
       discretization system, initial conditions for input variables
for i = 0 to n do
    foreach month do
        Initialize a state space simulator;
        Sample rates of change of input variables;
        m = Forecast number of wildfires given sampled input variables;
        Run Kettle ignition model for each big grid wildfire potential;
        for i = 0 to m do
            Randomize ignition big grid based on wildfire potentials;
            Randomize ignition small grid based on relative ignition risk;
            Initialize a wildfire object and wildfire simulator;
            Sample wind data for spread simulation;
            Run Kettle spread model to simulate wildfire spread;
            Adjust post-fire input variables of affected grids;
            Adjust big grid wildfire potential;
            Record affected area using wildfire vertex objects for risk
              estimation;
        end
        Add m to data to forecast number of wildfires next month.
    end
end
Aggregate affected grid result for wildfire risk estimation;
Output: Set of wildfire effect scenarios
```

FIG. 3E

---

Algorithm 7: Property portfolio wildfire risk assessment algorithm

---

```
Input: Property portfolio of size m, set of wildfire scenarios
Initialize loss map to record scenario id and total loss amount;
foreach scenario do
    foreach property do
        if property is in an affected grid then
            Estimate loss for the property and add to loss map;
    end
end
Output: Loss distribution of property portfolio
```

---

FIG. 3F

400

```
Optimization terminated successfully.
         Current function value: 0.139340
         Iterations 9
                           Logit Regression Results
==============================================================================
Dep. Variable:                   fire   No. Observations:                21847
Model:                          Logit   Df Residuals:                    21813
Method:                           MLE   Df Model:                           33
Date:                Thu, 04 Jun 2020   Pseudo R-squ.:                  0.7491
Time:                        21:03:58   Log-Likelihood:                -3044.2
converged:                       True   LL-Null:                       -12133.
Covariance Type:            nonrobust   LLR p-value:                     0.000
=====================================================================================
                        coef    std err          z      P>|z|      [0.025      0.975]
-------------------------------------------------------------------------------------
const               -15.2281      0.517    -29.461      0.000     -16.241     -14.215
MODIS_MOD09GQ_V6     -0.2026      0.533     -0.380      0.704      -1.247       0.842
MODIS_MOD14_V6        1.3941      0.314      4.446      0.000       0.780       2.009
SP_TILE_BA            2.5858      0.654      3.956      0.000       1.305       3.867
MODIS_MOD14A2_V6      0.5802      0.129      4.491      0.000       0.327       0.833
MODIS_MOD11B1_V6      0.6786      0.210      3.224      0.001       0.266       1.091
MODIS_MOD13A2_V6      2.3862      0.180     13.253      0.000       2.033       2.739
MODIS_MOD13A1_V6     -0.3944      0.222     -1.779      0.075      -0.829       0.040
SRTM_V3               0.5922      0.249      2.377      0.017       0.104       1.081
MODIS_MOD15A2H_V6     2.2077      0.173     12.762      0.000       1.869       2.547
MODIS_MCD43A2_V6      1.7246      0.525      3.284      0.001       0.695       2.754
MODIS_MCD43A4_V6     -0.3431      0.534     -0.643      0.520      -1.389       0.703
SP_TILE_DSWE          0.7237      0.457      1.583      0.113      -0.172       1.620
MODIS_MOD11_L2_V6    -0.8970      0.399     -2.249      0.025      -1.679      -0.115
MODIS_MCD19A1_V6      0.7312      0.174      4.202      0.000       0.390       1.072
MODIS_MOD11B2_V6     -1.3484      0.188     -7.172      0.000      -1.717      -0.980
MODIS_MCD43A3_V6      0.8676      0.114      7.616      0.000       0.644       1.091
MODIS_MOD11A1_V6     -1.1418      0.240     -4.748      0.000      -1.613      -0.670
MODIS_MOD09Q1_V6      1.3893      0.366      3.799      0.000       0.673       2.106
MODIS_MOD09A1_V6      0.3947      0.271      1.458      0.145      -0.136       0.925
SRTM_V2              -0.3890      0.284     -1.371      0.170      -0.945       0.167
ASTER_GED_AG100       0.5747      0.475      1.211      0.226      -0.356       1.505
LANDSAT_ETM_C1        1.4269      0.175      8.169      0.000       1.085       1.769
MODIS_MCD19A2_V6      1.9064      0.273      6.975      0.000       1.371       2.442
MODIS_MOD11A2_V6      0.4596      0.182      2.530      0.011       0.104       0.816
MODIS_MCD19A3_V6      0.8769      0.129      6.803      0.000       0.624       1.130
MODIS_MOD14A1_V6      1.5569      0.152     10.255      0.000       1.259       1.854
MODIS_MOD09GA_V6      0.9445      0.521      1.814      0.070      -0.076       1.965
ARD_TILE              0.5216      0.588      0.887      0.375      -0.631       1.674
GFSAD_GFSAD30NACE     2.4107      0.249      9.691      0.000       1.923       2.898
MODIS_MOD17A2H_V6    -0.2185      0.144     -1.519      0.129      -0.500       0.063
SRTM_V3_SRTMGL1       6.1624      0.142     43.439      0.000       5.884       6.440
MODIS_MCD43A1_V6     -0.2185      0.451     -0.485      0.628      -1.102       0.665
MODIS_MOD13Q1_V6      2.5468      0.218     11.701      0.000       2.120       2.973
=====================================================================================
```

FIG. 4

WILDFIRE IGNITION PREDICTION WITH SWARM NEURAL NETWORK ENSEMBLE

CROSS-REFERENCE TO RELATED APPLICATIONS

This application claims priority to and the benefit of U.S. Provisional Application No. 63/117,905, filed on Nov. 24, 2020, titled "WILDFIRE IGNITION PREDICTION WITH SWARM NEURAL NETWORK ENSEMBLE", the contents of which is herein incorporated by reference in its entirety.

BACKGROUND

Monitoring, analysis, and prediction of natural disasters has become a very active research area in recent years. For example, interest in wildfire monitoring and prediction has grown dramatically in recent time due to the devastating effects of the Australian and Californian wildfires. In the first 9 months of the 2019-2020 Australian bushfire season, the wildfires burned an estimated 46 million acres, destroyed over 5,900 buildings, and killed at least 34 people. In California, the 2018 wildfire season was the deadliest and most destructive wildfire season in the state, with an estimate of 8,527 fires burning two million acres, destroying 22,751 buildings, and taking 103 human lives.

The western United States has experienced a rapid increasing trend in annual wildfire burn area. Since the 1970s, annual wildfire extent has increased fivefold. Research has found the increase in frequency and size of major wildfires, such as ones in 2017 and 2018, to be the main factors for this. Several studies attribute reduced fuel due to warming-induced increases in evaporative demand, reduced snowpack, and reduced warm season precipitation frequency as the cause of this alarming trend. Furthermore, wildfire research that focus in western United States identify a diverse set of drivers for the increased wildfire activity: cumulative drying effects of atmospheric aridity and precipitation deficits, extreme offshore downslope wind events, seasonal effects, human activity, and vegetation gradients. The non-linearity in the interaction among the wildfire drivers makes the disentanglement of these drivers of changing wildfire activity difficult.

Moreover, anthropogenic climate change has been identified as a major factor for the increased wildfire burn area in California. Researchers studied possible links between anthropogenic climate change and observed changes in California wildfire activity across seasons, regions, and land cover types. They concluded that the large increase in annual forest fire area in the past several decades is very likely linked to anthropogenic warming, and the effect is most observed in the Summer. The anthropogenic warming effect in the Fall is likely to continue increasing.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1E illustrates ordinary linear regression results according to various embodiments disclosed herein.

FIG. 1G shows a flow diagram of an algorithm for frequency-based wildfire simulation according to various embodiments disclosed herein.

FIG. 1I shows a flow diagram of an algorithm for frequency-based simulation with forecast according to various embodiments disclosed herein.

FIG. 1J illustrates a table of parameters to the Rothermel model according to various embodiments disclosed herein.

FIG. 1K shows a flow diagram of an algorithm for simulation with Rothermel model and Huygen's principles according to various embodiments disclosed herein.

FIG. 1M shows a table of examined input variables according to various embodiments disclosed herein.

FIG. 3B shows a flow diagram of an algorithm for rate of spread training according to various embodiments disclosed herein.

FIG. 3C illustrates ordinary linear regression results according to various embodiments disclosed herein.

FIG. 3D shows a flow diagram of an algorithm for wildfire spread according to various embodiments disclosed herein.

FIG. 3E shows a flow diagram for an algorithm for a wildfire risk estimation system according to various embodiments disclosed herein.

FIG. 3F shows a flow diagram of an algorithm for property portfolio wildfire risk assessment according to various embodiments disclosed herein.

FIG. 4 shows logistic regression results according to an embodiment of the disclosed subject matter.

DETAILED DESCRIPTION

Figure 1A:
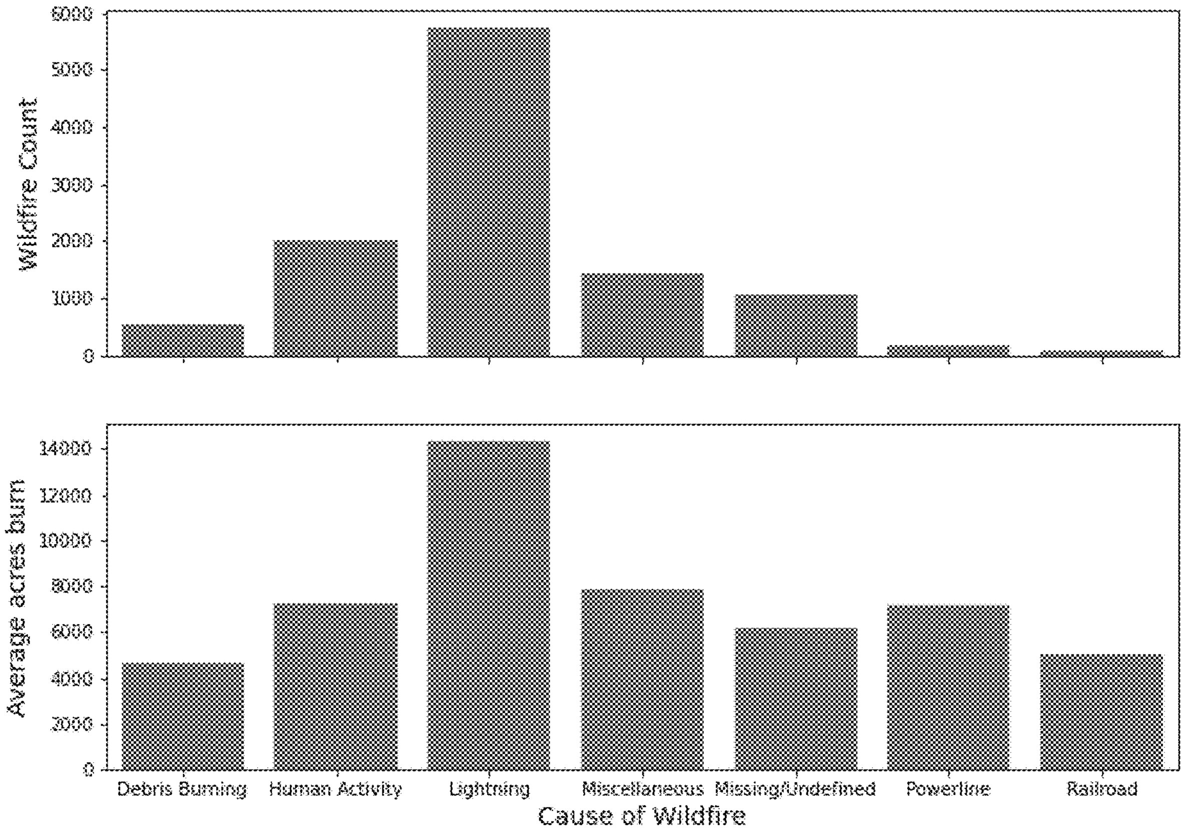
FIG. 1A illustrates direct causes of wildfire ignition according to various embodiments disclosed herein.

Over the past 15 years, there has been a dramatic increase in the size, scale, and overall destructive power of natural catastrophes. This increase in overall destruction is a result of changes in our climate and increased globalization. While almost all industries will be affected in the future, insurance and reinsurance (re/insurance) has extreme exposure to changes in the scale of natural catastrophes. In order to understand, price, and transfer this risk, it is imperative to use emerging modern technology to better analyze the underlying fundamentals of catastrophe risk. Current methods of modeling may not take into account the largest forms of new data, for example satellite imagery and weather mapping, because a large portion of this data is unstructured. In various embodiments disclosed herein, a system of data processing may translate this data into a usable format, and such translated data may subsequently be utilized by a simulation system to best estimate the risk of wildfire in discretized mesh of the state of California. In one embodiment, a simulation system may consist of a wildfire ignition probability prediction model, a wildfire spread model, and a time-series model that estimates the effects of climate change. In this embodiment, models may return impressive performance, suggesting that they are suitable as parts of a simulation system that measures wildfire risk while taking into consideration the effects of climate change.

The national Fire Program Analysis (FPA) system has been acquiring records from federal, state, and local systems since 1992. Some of the data were published and became available to the public in 2015. This data set is referred to Fire Program Analysis fire-occurrence database (FPA FOD) and contains 1.88 million wildfires, representing a total of 140 million acres burned during the 24-year period in the U.S. from 1992 to the year of publishing. The data contains many fields necessary for analysis of wildfire statistics and trends in America such as discovery date, final fire size, ignition point with 1 square-mile precision, and containment date. As a brief description on data quality, once aggregated by FPA, the wildfire data were transformed to conform to the data standards of the National Wildfire Coordinating Group (NWCG). Error-checking was performed and redundant records were identified and removed.

Modern data such as the FPA FOD, though could not go so far back, is often better to use for analysis due to better data uniformity and minimal noise as they are recorded in accordance with modern data recording standards. It is common in practice to remove data dated far back to eliminate excessive noise.

Effects of extreme offshore downslope wind events from the Pacific Ocean may lead to frequent and severe wildfires in California. In one study, the non-linearity in the interaction among the wildfire drivers such as seasonal effects, human activity, and vegetation gradients in western United States may make meaningful disentanglement of drivers of wildfire activity difficult. Seasonality of wildfires may support a long-believed hypothesis that links wildfire frequency to high temperature and atmospheric aridity, the characteristics that often accompany the summer months. However, anthropogenic climate change may be a more influential factor for increased wildfire activity based on high frequency of wildfire being linked to increased human activity during the summer and the general anthropogenic warming effect may be lasting and carry over to other times of the year, especially during the fall season.

To analyze the direct causes of ignition, reported data on both cause frequency and average acre burn associated with these direct causes may be studied. FIG. 1A demonstrates that most wildfires may be caused by lightning, and human action comes in second as a direct cause of wildfire. The average acre burned of lightning-caused wildfires is the highest, perhaps due to difficulty of fire detection and suppression when lightnings cause ignitions in remote forest areas. In addition, wildfires caused by power line failure have become a topic of debate recently in California. Though they are not as frequent, wildfires caused by power line failure often accompany major prolonged disruption of daily activities for many people and businesses, leading to significant economic damage.

It is widely accepted by the body of environmental research that climate change is affecting both frequency and severity of wildfires. Climate affects wildfire risks primarily through its effects on moisture availability. Wet conditions during growing seasons promote fuel via the growth of vegetation and dry conditions during and prior to the fire season increase flammability of vegetation that fuels wildfires. Moisture availability, in turn, is a function of precipitation and temperature, as higher temperature reduces moisture availability via increased evapotranspiration, reduced snowpack, and earlier snowmelt.

The relationship among the wildfire drivers may be far from straightforward. For instance, a wet, densely forested ecosystem would have abundant fuel, and thus the incremental effect of a single wet season would be negligible. In such an ecosystem, fuel flammability is the limiting factor for wildfire risk, and large fires often occur when there is sufficient energy to dry out the fuel i.e. large wildfires could happen when the temperature is consistently and abnormally high. On the other hand, a relatively dry ecosystem dominated by low density of vegetation would have sparse fuel coverage that spread of large wildfires would be limited by fuel availability. Such an ecosystem, once receiving abnormally high precipitation could experience growth in additional vegetation and increase in fuel coverage enough for the spread of large wildfires.

The above scenarios illustrate the complexity in the interaction between climate and wildfire risks. There are a great variety of both vegetation and fire regime found in America, which makes wildfire risk estimation challenging. Other highly variable factors such as terrain and wind also add significantly to the complexity. Furthermore, some climate effects could be lagging. For example, a significant correlation may be found between the area burned in south California deserts and growing season moisture anomalies in the preceding year, but not current year drought. In addition, to estimate the impact of climate change to wildfire risk, general circulation model output may be linked to local weather and fire records, and fire outcomes may be projected with an initial-attack suppression model. Despite enhancement of fire suppression effort, the current rate of wildfire in northern California extrapolates to an average annual increase of 12,000 acres burn, or a 50% increase, for the region.

Figure 1B:
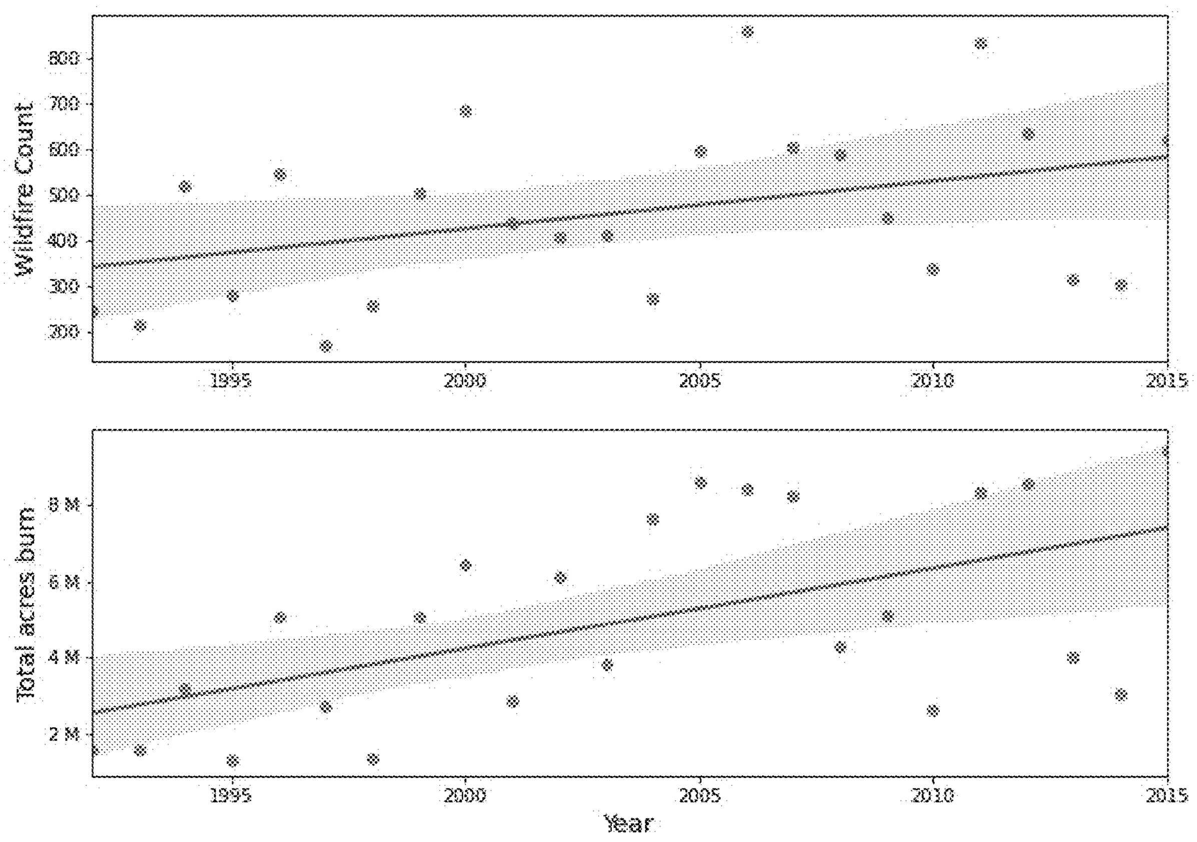
FIG. 1B illustrates increasing trends in wildfire frequency and burn area in the U.S. according to various embodiments disclosed herein.

FIG. 1B demonstrates the increasing trends in both frequency and severity of wildfires. Wildfire potential may increase significantly in the United States as a result of sustained warming. The latest version of the Fire Program Analysis fire-occurrence database ends at 2015, but the trend has been observed by the two record fire seasons of 2017 and 2018.

In sum, current academic research has found that climate change introduces additional unpredictability to the already complicated problem of wildfire prediction, prevention, and management. Scenarios previously only perceived as extreme anomalies begin to happen frequently. An accurate method of estimating wildfire risk in the current climate is needed more than ever to assist with fire monitoring and fire suppression to reduce the damage wildfires cause to human lives.

There are straightforward approaches to develop an insurance wildfire risk assessment using only the Fire Program Analysis fire-occurrence data. In insurance, risk estimation often spans a duration of one year, which is the typical length of an insurance policy. The number of wildfires in the year of analysis may be simulated by two ways: (1) sample from historical wildfire counts, and (2) forecast the range of wildfire counts and then sample from the forecast confidence interval.

Method (1) assumes that the wildfire count stochastic process is stationary, and hence random sampling is statistically valid. As a brief definition, a stationary process is a stochastic process whose unconditional joint probability distribution does not change when shifted in time. Consequently, its parameters such as mean and variance also do not change over time. Method (2) refutes the stationary assumption. In this section, a simulation scheme may be constructed based on (1) for insurance wildfire risk estimation to motivate and inform readers of the way a wildfire risk estimation scheme could be developed. In various implementations, a simulation scheme disclosed herein may follow the same construction logic but using more concrete assumptions and better technology.

The goal of insurance wildfire simulation is to obtain the most accurate and realistic distribution of wildfire burn in terms of geographic location and spread severity. Accuracy in location distribution is important for making insurance portfolio decisions, while wildfire burn severity distribution is critical in loss estimation and pricing. To attain better simulation results, it may be preferred for a simulation system to use a monthly analysis instead of an annual one. As shown in various studies in wildfire research, locations of ignition and severity of burn vary widely across time of the year. An annual simulation scheme that is based on sampling from a distribution could be skewed heavily towards summer events where wildfire events are more frequent.

Figure 1C:
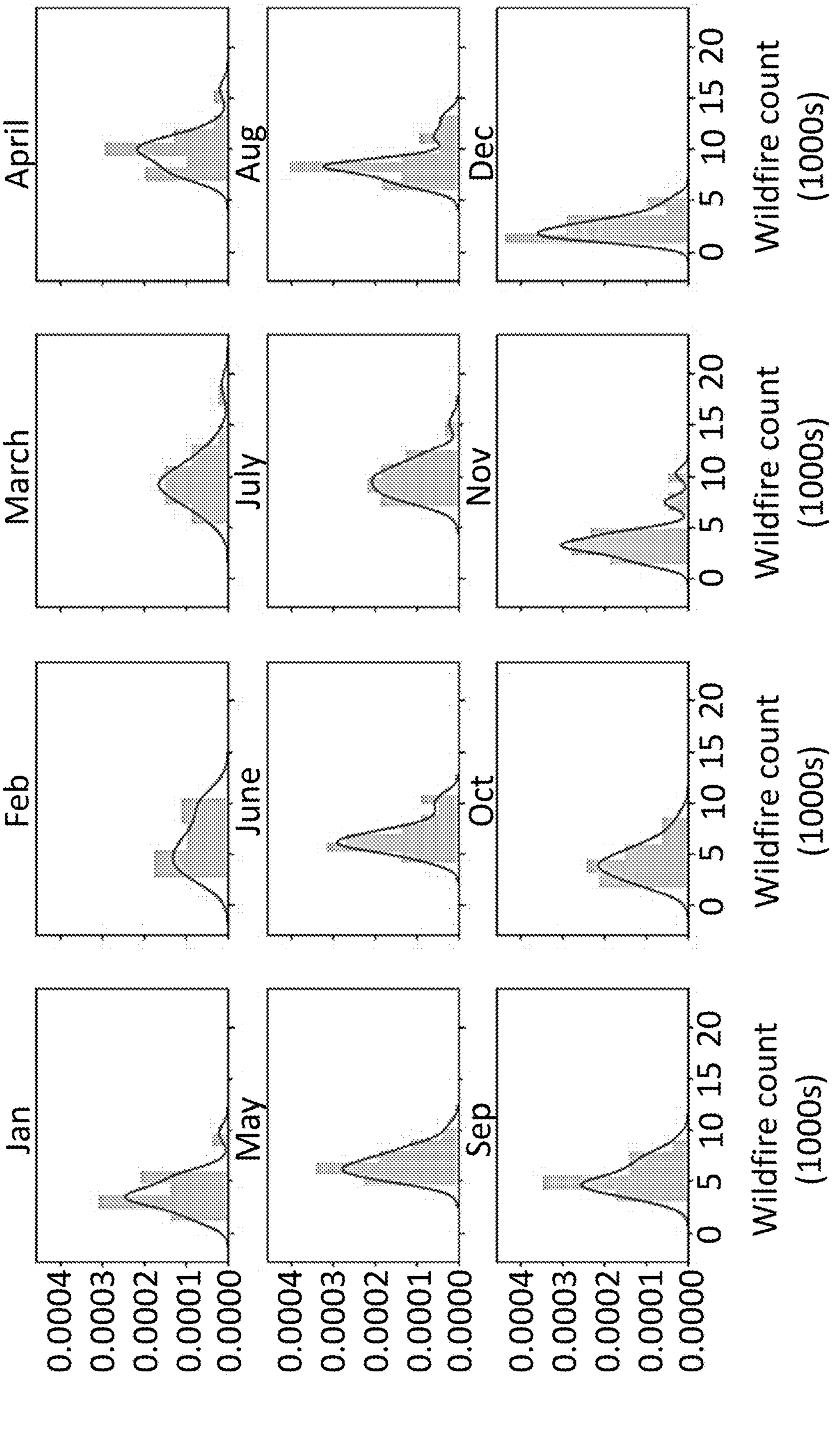
FIG. 1C illustrates monthly distribution of wildfire frequency according to various embodiments disclosed herein.

Method (1) may begin with sampling a number of wildfires for each month of the year. FIG. 1C visualizes the distribution of wildfire frequency from January to December. One can either fit a distribution from the data and sample from such distribution or directly sample from historical monthly count data.

Figure 1D:
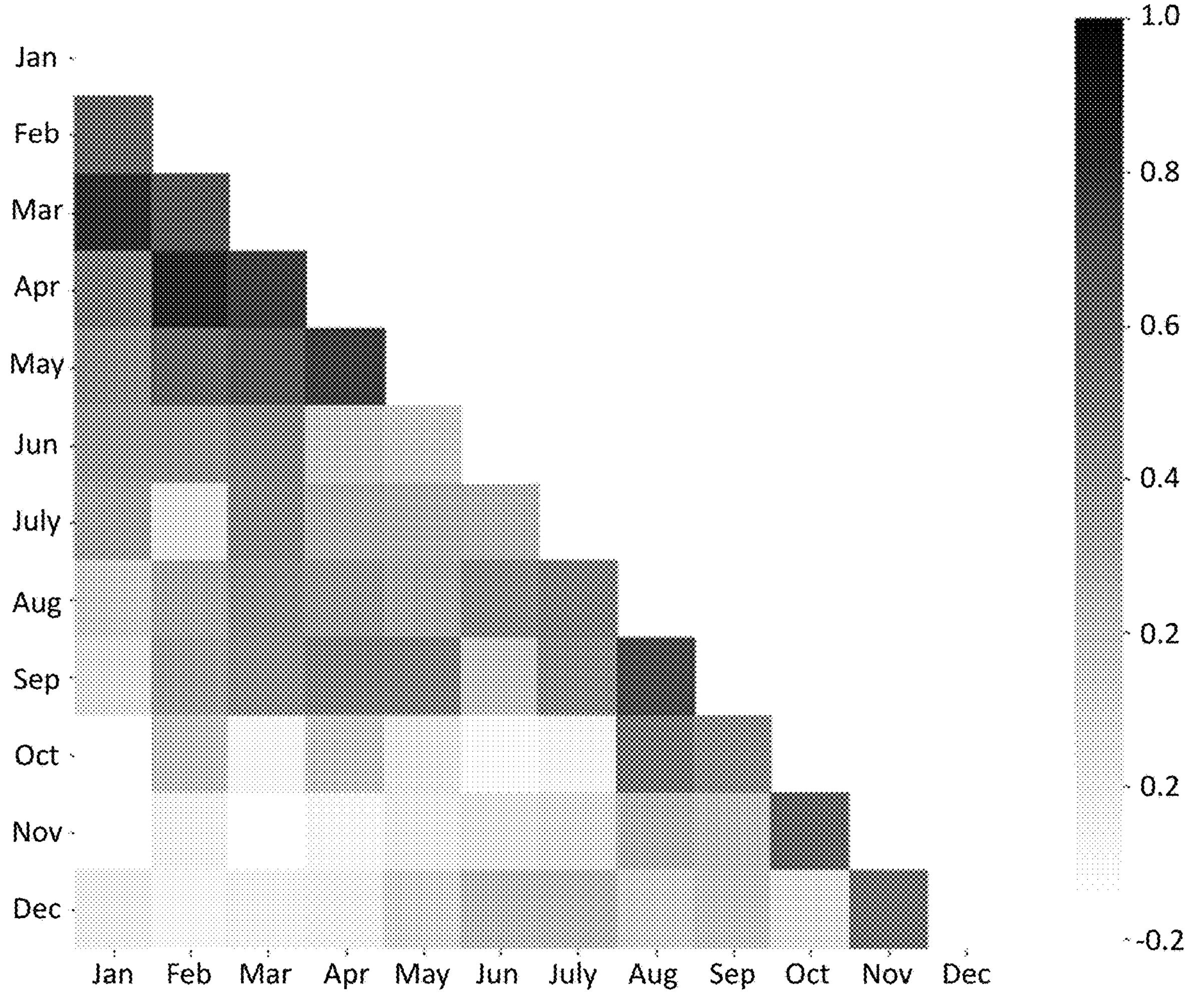
FIG. 1D illustrates correlation among monthly wildfire frequency according to various embodiments disclosed herein.

Next, whether or not to capture the correlation between the monthly wildfire frequencies may be decided. FIG. 1D suggests that there is significant correlation among monthly wildfire frequencies of sequential months. Pearson's r, a statistic that measures linear correlation between two variables and range from +1 and −1, may be found by:

$$r_{xy} = \frac{\sum_{i=1}^{n} (x_i - \bar{x})(y_i - \bar{y})}{\sqrt{\sum_{i=1}^{n} (x_i - \bar{x})^2} \sqrt{\sum_{i=1}^{n} (y_i - \bar{y})^2}} \quad (1)$$

which is essentially covariance of x and y over the product of standard deviations of x and y. For Pearson's r, a value of +1 is total positive linear correlation, 0 is no linear correlation, and −1 is total negative linear correlation. There are several ways to work with correlation among the monthly frequencies for sampling purposes. For instance, a multivariate distribution may be fit for the monthly frequencies and then sample from this distribution.

After the monthly frequency sampling is done, burn area and locations of each burn may be simulated. We need to also establish a not readily obvious fact that the periodic wildfire frequency is positively correlated with burn area. Though the academia has extensively analyzed this relationship, we can try fitting a regression model to study this relationship. FIG. 1E presents the regression results by ordinary least-square (OLS) regression.

Though there have been statistical methods that are more capable of learning non-linear connections, ordinary least-square regression remains a reliable way to study relationship among a set of independent variables and the dependent variable, as the OLS coefficients are straightforward to interpret. Dummy variables may be created for each month and the dummy variables and wildfire count may be regressed against the fire size variable. Mathematically, a linear regression equation may have the form:

$$\text{Fire size}(\theta, \beta) = \sum_{i=1}^{12} \mathbb{1}\{\text{month} = i\} \times \alpha_i + \beta \times (\text{wildfire count}) \quad (2)$$

where θ is the set of monthly coefficients θ, $\{\alpha_1, \alpha_2, \ldots, \alpha_{12}\} \in \theta$, β is the coefficient of wildfire count, and || is the indicator function that turns to 1 when i equals to the according month. Using the p value in the regression analysis, we see that at p<0.05 confidence interval, only the coefficients for March, April, July, and August are statistically significant. The t-value for wildfire count coefficient is high, demonstrating the statistically significant positive relationship between wildfire frequency and total wildfire burn area. The adjusted R-square is 0.704, implying that the included variables could explain around $70% of the variance in monthly seasonal burn size.

Figure 1F:
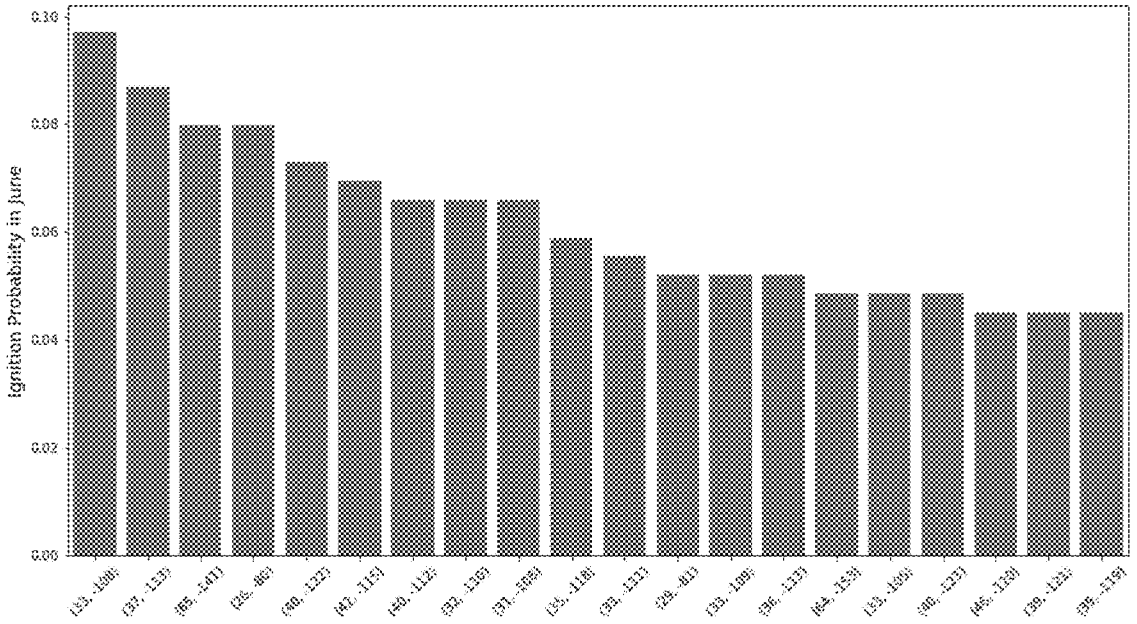
FIG. 1F illustrates probability of wildfire ignition for some discretized grids in the month of June according to various embodiments disclosed herein.

After getting the number of wildfires and understanding the relationship between wildfire frequency and wildfire total burn size, the next task is determining the locations of the wildfires and the spread of each of them. Method (1) may proceed by discretizing the United States into square grids of a specific size. This discretization enables us to calculate the probability of wildfire ignition for each grid in each month. For example, FIG. 1F illustrates a probability of wildfire ignition for some discretized grids in the month of June with a gird span of 1 degree of latitude and 1 degree of longitude, which equals an area of approximately 3,726 square miles.

For grids that never experienced a wildfire ignition, an ignition probability may be set to zero. As discussed in a prior section, lightning is the most frequent cause of ignition for major wildfires, and accounts for much of the randomness in the exact ignition location of wildfires. While using a smaller grid system (e.g. 50 square mile grid) may improve precision for the ignition location simulation, it makes calibrating the correct probability of ignitions more challenging as data availability decreases; concurrently, setting grids to zero would become more erroneous. However, with a bigger grid system, selection of the exact latitude and longitude of ignition may be difficult as the range is large. To combat this issue, interpolation may be used, for example the ubiquitous inverse distance weighted (IDW) interpolation.

Inverse distance weighted interpolation may make the assumption that locations that are close to one another are more alike than those that are farther apart. To predict a value for any unmeasured location, IDW may use the measured values surrounding the prediction location. Now, the IDW may be designed such that the measured values closest to the prediction location have more influence on the predicted value than those farther away. IDW may assume that each measured point has a local influence that diminishes with distance, and may give greater weights to points closest to the prediction location, and the weights may diminish as a function of distance.

Now, there are two ways to apply IDW to the problem at hand. A bigger grid system may be used and set the grids with no ignition to zero probability, then break the bigger grids with non-zero ignition probabilities into smaller grids, and use interpolation within the grids. Alternatively, a smaller grid system may be used from the beginning and use interpolation for the entire U.S., while setting all the regions with prior knowledge of zero probability of wildfire ignition such as the urban cities or areas with no fuel to zero. The former method will be discussed in further detail.

A probability may be assigned to every smaller grid in a big grid in order to generate a more precise wildfire ignition point. Thus, P(x) may be found for all small subsets within the study region:

$$P(x): x \rightarrow \mathbb{R},\ x \in \mathcal{D} \subset \mathbb{R}^2 \tag{3}$$

where x are the smaller grid (or rounded latitude, longitude points depending on experiment design) and $\mathcal{D}$ is the studied big grid. What is known is a set of $\{(x_1, P_1), (x_2, P_2), \ldots, (x_N, P_N)\}$ that may be determined from data. As a note, a grid could be presented in 2-dimension using either the middle point or corner point as grid sizes are uniform. Since $$\sum_{i=1}^{N} P(x_i) = 1$$

is wanted, an interpolation may be performed and then normalize $P(x_i)$ using $$\sum_{i=1}^{N} P(x_i)$$

once all $P(x_i)$ are found. Also, for this interpolation technique to work in this experiment, at least the probabilities of ignition at each corner of the grid may be needed. These quantities may be approximated by interpolating from the nearest neighboring grids. Now, each $P(x_i)$ could be found using:

$$P(x) = \begin{cases} \sum_{i=1}^{N} w_i(x)P_i(x) & \text{if } d(x, x_i) \neq 0 \\ 0 & \text{otherwise} \end{cases} \tag{4}$$

$$w_i(x) = \frac{1}{d(x, x_i)^P}$$

where x denotes an interpolated (arbitrary) point, $x_i$ is an interpolation known data point, $d(x, x_i)$ is a distance metric from the points $x_i$ to the unknown point x, Nis the total number of known points used in interpolation and p is a positive real number also known as the power parameter.

After performing IDW interpolation, a set of ignition probability may be obtained for every latitude longitude pair. It means that for every simulation, for every month, a grid with non-zero ignition probability may be randomly sampled, a random uniform number within the range of 0-1 may be generated, and whether a wildfire will ignite at that location may be decided. Similarly, for more robust computation, the big grid wildfire probability may be normalized by using its sum, a uniform number within the range 0-1 may be generated, and the grid whose the generated number is in the cumulative probability range may be selected. The steps may be repeated until the simulated number of total wildfires in the period is met.

The final step of the scheme is simulating the actual spread of each wildfire from the simulated ignition points. To perform this simulation, A Rothermel model may be used, which will be described below. The classical Rothermel model, or components of it, may be found in almost every wildfire spread prediction research and wildfire risk estimation product in the market. Summarily, the Rothermel model posits that wildfire spread has a form of an ellipse and that wildfire spread patterns depends on a list of 13-40 variables depending on the version of the model. Because of the large number of variables, the Rothermel model, when applied in wildfire spread software, is quite computationally costly. In a simulation scheme, increasing number of variables implies that one needs many more simulations to retain the same level of precision.

Wind directions and wind speed may be simulated from historical monthly weather data in respective simulated grids. Wind data may be obtained from NOAA weather station dataset, and interpolation may be used for the locations between the weather stations. The wind data may be sampled at the point of wildfire ignition and follow Rothermel's formula to model wildfire spread in elliptic shape away from ignition point in the direction of the wind. For simplicity, all weather characters may be assumed to remain constant during the wildfire event. Downwind spread is typically around 25% of the total length of the spread. As ellipses are defined by two axes, Rothermel defines the relationship between wind speed and wildfire ellipse's length-to-width ratio as:

$$\frac{L}{W} = 1 \div (0.25 \times \text{Wind speed}) \tag{5}$$

For the size of the spread, the same procedure performed for ignition probability may be followed. Using the regression analysis in FIG. 1E, the total burn area may be generated using the simulated numbers of wildfires. A burn size from the burn data of the outer grid may be sampled to create an elliptical spread for any wildfire event by using the simulated wind speed, simulated wind direction, and equation (5). Each monthly simulation ends when either (1) total wildfire number is reached or (2) total burn area is reached. Algorithm 1, as illustrated in FIG. 1G, outlines the entire frequency-based simulation scheme that we have constructed in this section.

The frequency-based scheme constructed in this section is not without weaknesses. First, it ignores the evident fact that climate change is affecting the frequency and severity of wildfires. Given proofs that the number of wildfires does not follow a stationary process, a fact also confirmed by many research, random sampling a number of wildfire events from historical data likely underestimates wildfire risk. Second, besides the simulation of wind data for wildfire spread approximation, the frequency-based scheme fails to inspect the relationship between the weather and wildfire statistics. Since the academia has shown the complexity in the relationship between several weather factor and wildfire risk, taking weather factor into account in a simulation scheme may be posited to help increase its precision and accuracy, as sampling would fail to incorporate the connection between climate change to the warming and drying weather and eventually to wildfire risk.

On the other hand, the frequency-based scheme also has many other positive traits. First, it is simple to set up, and given hundreds of thousands or millions of simulations, it could do a decent job of estimating wildfire risk if climate change does not exist. For this reason, it or similar versions of it may be found being used in practice. In addition, the structure of this scheme is coherent and has the same framework as suggested by Wildfire framework. This structure is flexible, enabling modular improvements to separate parts of the scheme to improve the general effectiveness of the simulation scheme. For example, in the next section an integration of a time-series forecast model to reflect the increase in frequency and severity of wildfires due to climate change is discussed.

To further examine the effects of climate change to frequency and severity of wildfires found in various papers, the Augmented Dickey-Fuller (ADF) test for stationarity may be conducted for the monthly wildfire number and burn size time series processes. At p=0.08728 and p=0.3274 respectively for monthly wildfire number and size, the null hypothesis may not be rejected that these processes are non-stationary. Thus, the Fire Program Analysis fire-occurrence data suggests that the frequency and size of wildfire are not stationary, implying that assumption (1) in the previous section fails. In this section, Seasonal Auto Regressive Integrated Moving Average (SARIMA) is introduced and implemented to take into account the effects of climate change and improve the frequency-based simulation scheme outlined in the previous subsection.

SARIMA is a Box-Jenkins technique that takes into account time series data and decomposes it into four different processes. The first process, Auto Regressive process (AR), is a real-valued stochastic process. An AR process $(Y_t)$ of order p, denoted by AR(p), has the form:

$$y_t = \alpha_1 y_{t-1} + \alpha_2 y_{t-2} + \ldots + \alpha_p y_{t-p} + \epsilon_t \quad (6)$$

such that at each time t, $y_t$ is defined by a linear combination of its past values $y_{t-1}, \ldots, y_{t-p}$ and random noise $\epsilon_t$. By equation (6), the AR process may be seen as essentially a regression of a times series value with its historical values as independent variables. Thus, the parameters $\alpha_i$ could be obtained by ordinary least squares method. The order p of the AR process determines the number of past values it includes.

The second process in SARIMA is the Moving Average (MA) process. An MA process $(Y_t)$ of order q is a real valued stochastic process, denoted by MA(q), if there exists a set of $\beta_1, \ldots, \beta_q$ and white noise $\epsilon_t$ such that:

$$y_t = \beta_0 \epsilon 1 + \beta_1 \epsilon_{t-1} + \beta_2 \epsilon_{t-2} + \ldots + \beta_p \epsilon_{t-p} \quad (7)$$

The value of MA(q) process at time t is therefore a linear combination of its own past errors. The combination of the Auto Regressive process and Moving Average is the Auto Regressive Moving Average process (ARMA). A real-valued stochastic process $(Y_t)$ is said to be an ARMA process of order p, q, denoted by ARMA (p, q) if it satisfies:

$$y_t = \epsilon_t + (\alpha_1 y_{t-1} + \alpha_2 y_{t-2} + \ldots + \alpha_p y_{t-p}) + (\beta_1 \epsilon_{t-1} + \beta_2 \epsilon_{t-2} + \ldots + \beta_p \epsilon_{t-p}) \quad (8)$$

which could be re-written under the form:

$$\phi(x) Y(t) = \theta(z) \epsilon_t \quad (9)$$

where $$\phi(z) = 1 + \alpha_1 z + \alpha_2 z^2 + \ldots + \alpha_p z^q \quad (10)$$
$$\theta(z) = 1 + \beta_1 z + \beta_2 z^2 + \ldots + \beta_q z^q$$

are the characteristic polynomials of the AR and MA part of an ARMA (p, q) process $(Y_t)$ respectively; and z is the lag operator. The Auto Regressive Integrated Moving Average (ARIMA) broadens the class of ARMA models by including differencing. A process $(Y_t)$ is an ARIMA process of order (p, d, q) if $(1-z)^d$ is a causal ARMA (p,q). The corresponding ARIMA equation is:

$$\phi_p(z)(1-z)^d Y(t) = \theta_q(z) \epsilon_t \quad (11)$$

Now, for a non-stationary time series containing seasonality, in which a season periodic component repeats itself after every N observations for some integer N, Box-Jenkins defines a general multiplicative Seasonal ARIMA model (SARIMA) as follows:

$$\phi_p(z) \Phi_P(z^s)(1-z)^d (1-z^S)^D Y(t) = \theta_q(z) \Theta_Q(z^s) \epsilon_t \quad (12)$$

where $\phi_p(z)$, $\Phi_p(z^s)$, $\theta_q(z)$, $\Theta_Q(z^s)$ are characteristic polynomials of orders p, P, q, Q respectively. d and D are the orders of non-seasonal and seasonal differencing respectively.

To fit the SARIMA model to FPA-FOD data, the above required 7 model parameters may need to be selected. Parameter search may be performed by using grid search from all possible permutations of the parameters. The coefficients to the models are estimated by the maximum likelihood estimation method; and the performance metrics chosen to evaluate the competing models is the Akaike Information Criterion (AIC):

$$AIC = 2k - 2\ln(L) \quad (13)$$

Figure 1H:
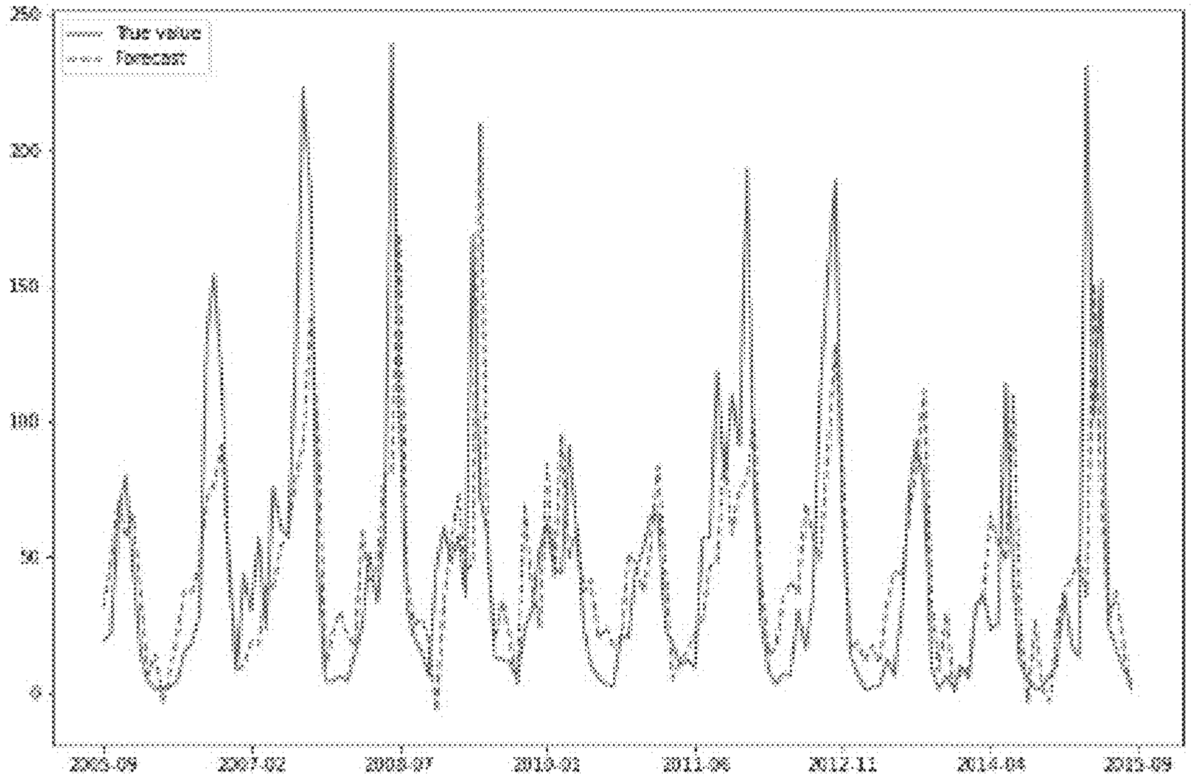
FIG. 1H illustrates a forecast of wildfire number in the U.S. according to various embodiments disclosed herein.

The optimal model for wildfire frequency forecast may be found to be SARIMA(2, 0, 2, 3, 1, 3, 3) where the notation is in the form SARIMA q, d, p, $q^s$, $d^s$, $p^s$, s. For the test of this time-series model, a train and test set may be split into two equal sets of 50%-50%. Here, the number of wildfires for the next month may be forecasted. The root mean square error (RMSE) may be found to be 49.9 for the test data, which is very good considering the standard deviation of the entire set being 46.2. FIG. 1H illustrates the results of SARIMA model forecasting one month in the future. Using a liberal number of data points helps with illustrations, but in practice splits of 80%-20% or 85%-15% may be more practical.

There are several experiments that can be done to improve the quality of forecast. For example, some exogenous variables may be included such as temperature, wind speed, vegetation index time series that potentially correlate with wildfire frequency, and the like. Additionally, wildfire count model may be trained using SARIMA for all discretized grids. Further, experimentation may be performed with machine learning techniques that have been shown to perform well with times series such as the recurrent neural network (RNN), long-short term memory (LSTM) model, or attention network. Algorithm 2, as illustrated in FIG. 1I, is included that builds upon Algorithm 1.

By forecasting the effects of climate change, Algorithm 2 may be a significant improvement over Algorithm 1. Aspects still could be further improved for better wildfire risk assessment including better estimation of ignition probability for the grid system and better estimation of potential spread for each generated wildfire. Modern data and methods exist that could significantly help with these estimations and these data and methods are analyzed in greater detail below.

The Rothermel surface fire spread model is the most commonly used in U.S. fire management systems, despite the fact that there exist many other models for surface fire spread. The use of the Rothermel model and its extension can be found in many arenas: fire and fuel management, fire ecology, climate change, suppression, smoke, fuel hazard assessment, and budget planning. By describing the Rothermel model, the basics of wildfire modelling may be introduced with respect to the physical components that govern the ignition and spread of wildfires, some of which may be found in parts of various implementations disclosed herein.

Initially used as a quantitative way to calculate U.S. fire-danger rating indices, the Rothermel model gradually became a tool used mostly to predict the behavior of an ongoing wildfire. Implementation of Rothermel fire model could be observed through the evolution of technology. The extensions of Rothermel model in nomographs, handheld calculators, internet-based systems, and complex wildfire spread estimation systems such as BehavePlus or Farsite have been described.

Several classes of available wildfire models have been surveyed: physical and quasi-physical models, empirical and quasi-empirical models, and simulation and mathematical analogue models. For definitions: a physical model may be one that attempts to represent both the physics and chemistry of fire spread; a quasi-physical model may attempt to represent only the physics; an empirical model may be one that contains no physical basis at all and may be generally statistical in nature; and a quasi-empirical model may be one that uses some form of physical framework on which the statistical modeling is based. Mathematical analogue models may be those that utilize a mathematical precept rather than a physical one for the modeling of the spread of wildland fire. Simulation models may be those that implement a fire behavior model in a landscape spread application. Of 14 simulated models in one paper, the Rothermel model is listed as the primary spread model for nine of them.

Using categorization, the Rothermel model is a quasi-empirical model. As a brief introduction, the Rothermel model is based on a heat balance model, data retrieved from wind tunnel experiments in artificial fuel beds of varying characteristics, and Australian wildfire data in grasses. The model follows the conservation of energy described by a heat source divided by a heat sink. It assumes that the flame front is linear and calculates the spread rate of fire fronts in different combinations of wind and slope. The fuel data input for the model is a mixture of various size classes of live and dead fuel, with a single representative depth. The model defines fine dead fuel as its most influential component. Additionally, it only addresses fire in surface fuel, which can include brush and small trees, within six feet off the ground. Lastly, the original Rothermel model is designed to use fuel, moisture, and terrain data prior to ignition as inputs.

The Rothermel model contains strong assumptions and hence has significant recognized limitations. Most users and system developers implement additional parameters such as flame length, fuel moisture, fuel, wind, or spread direction for their applications. The Rothermel model is ubiquitous because its strengths far outweigh its weaknesses. First, it is simple as its input requirements and calculations are easy to obtain. Second, it remains flexible enough for users to change fuel parameters, a feature typically not possible with traditional statistical models developed for specific fuel types, or extend parameter space for use in their own applications. As mentioned, various implementations of wildfire spread model disclosed herein may be an extension of Rothermodel; it belongs to the quasi-empirical class of wildfire spread model.

In this section, a layout of important formulas and components in the Rothermel model is provided. In this section, the quantitative description for the basic case of Rothermel model may be followed.

The Rothermel model uses the heat balance model as its foundation. In a specific size class of dead fuel, the terminal rate of spread may be defined as heat source divided by heat sink:

$$R = \frac{I_R \xi (1 + \phi_w + \phi_s)}{\rho_b \epsilon Q_{ig}} \tag{14}$$

where the parameters and their relationships can be found in FIG. 1J. In order to calculate the variables needed in equation (14), quite a number of inputs may be needed. The formula for the reaction intensity, $I_R$, measured in Btu/ft$^2$/min and other variables may be found a set of formulas:

$$I_R = \Gamma' w_n h \eta_M \eta_s \tag{15}$$

$$\Gamma' = \Gamma'_{max} \left( \frac{\beta}{\beta_{op}} \right)^A$$

$$\Gamma'_{max} = \frac{e^{\left[A\left(1 - \frac{\beta}{\beta_{op}}\right)\right]}}{\sigma^{1.5}(495 + 0.0594\sigma^{1.5})}$$

$$\beta = \frac{\rho_b}{\rho_p}$$

$$\beta_{op} = 3.34\sigma^{-0.8189}$$

$$\rho_b = \frac{w_0}{\delta}$$

$$A = 133\sigma^{-0.7913}$$

$$w_n = w_0(1 - S_T)$$

-continued $$\eta_M = 1 - 2.59 r_M + 5.11 (r_M)^2 - 3.52 (r_M)^3$$

$$r_M = \max\left(\frac{M_f}{M_x}, 1\right)$$

$$\eta_S = \max\left(0.174 S_e^{-0.19}, 1\right)$$

where Γ' is the optimum reaction velocity and $\Gamma'^{max}$ is the maximum reaction velocity in the unit of $min^{-1}$; β is packing ratio and $\beta_{op}$ is the optimum packing ratio; $\rho_b$ is the even-dry bulk density in $lb/ft^3$ unit; $w_n$ is net fuel load in $lb/ft^2$ unit; and $\eta_M$ is the moisture damping coefficient and $\eta_S$ is the mineral damping coefficient. The inputs required to compute $I_R$ include: h it low heat content in Btu/lb unit, which often has the value of 8,000 Btu/lb; σ is the surface-area-to-volume ratio in the units of $ft^{-1}$ $$\left(\frac{ft^2}{ft^3}\right);$$

$\rho_p$ is the oven-dry particle density in $lb/ft^3$ unit; $w_0$ is oven-dry fuel load in $lb/ft^2$ unit; δ is the fuel bed depth in ft unit; $S_T$ is total mineral content, which is generally 0.0555 lb minerals/lb wood; $M_f$ is the moisture content in dry weight basis; $M_x$ is the dead fuel moisture of extinction; and $S_e$ is the effective mineral content, which is generally 0.010 (lb minerals–lb silica)/lb wood.

Now, the wind factor $\phi_w$ could be found using the following equation:

$$\phi_w = C U^B \left(\frac{\beta}{\beta_{op}}\right)^{-E} \tag{16}$$

$$C = 7.47 e^{-0.1333\sigma^{0.55}}$$

$$B = 0.02526\sigma^{0.54}$$

$$E = 0.715 e^{-3.59\times10^{-4}\sigma}$$

where U is the wind velocity at midflame height in the unit of ft/min. Lastly, the slope factor $\phi_s$ could be found using:

$$\phi_s = 5.275\beta^{-0.3}(\tan\phi)^2 \tag{17}$$

where tan ϕ is the slope steepness. The last two parameters for equation (14) can be found by:

$$\epsilon = e^{-138/\sigma} \tag{18}$$

$$Q_{ig} = 250 + 1116 M_f$$

In terms of fuel models, Rothermel specifies 11 fuel models and two were added later. The thirteen fuel models include:

1. Short grass
2. Timber grass and understory
3. Tall grass
4. Chaparral
5. Brush
6. Dormant brush, hardwood slash
7. Southern rough
8. Short needle litter
9. Long needle or hardwood litter
10. Timber litter and understory
11. Light logging slash
12. Medium logging slash
13. Heavy logging slash Each of the fuel models listed above has its own characteristics in terms of fuel load, surface-area-to-volume ratio, bulk density, etc. For example, research in 2005 extends Rothermel to a list of 40 fuel models. The Landfire project publishes data for both the 13 fuel models and 40 fuel models. However, the data is not updated frequently and the latest version published in 2014. This is understandable as surveying fuel models takes a lot of effort.

In two dimensions, fire shapes are assumed to be elliptical under uniform conditions, which is defined to occur when the factors affecting fire behavior such as fuels, weather, and topography are constant. While these conditions never occur in nature, in a short time and for small fires, the uniformity approximation may not be far off. However, some observations indicate that wildfires, under relatively uniform field conditions have roughly egg shaped; while some observations indicate them to be fan shaped. This difference in observations may be likely caused by variations in environmental or spread conditions inherent to empirical fire data, and suggests the difficulty in accurately theorizing wildfire spread. Regardless of the theoretically correct wildfire shape, if it really exists, the high variance in wildfire shapes is known to increase with increasing wind-speed or slope steepness or both. Moreover, the change in a wildfire's shape may be assumed to be exponential and independent of the type of fuel in which the fire is burning.

The Huygens' principle states that (1) every point on a wave front is itself the source of spherical wavelets, (2) the secondary wavelets emanating from different points mutually interfere, and (3) the sum of these spherical wavelets forms the wave front. An implementation of Huygen's principle has been developed as a fire growth model by formulating set of differential equations that describe the expansion of an elliptical wave front from a series of vertices that define the edge of a fire. Huygens' principle assumes each wildfire vertex as the source of an independent elliptical expansion. At each vertex, the required parameters include: the orientation of the vertex on the fire front in terms of component differentials $x_s$ and $y_s$, the direction of maximum fire spread rate θ, and the dimensions that make up the shape of an ellipse a, b, and c. From these inputs, the orthogonal spread rate differentials for a given vertex may be computed using the equation:

$$X_t = \frac{a^2\cos\theta(x_s\sin\theta + y_s\cos\theta) - b^2\sin\theta(x_s\cos\theta - y_s\sin\theta)}{\left(b^2(x_s\cos\theta + y_s\sin\theta)^2 - a^s(x_s\sin\theta - y_s\cos\theta)^2\right)^{1/2}} + c\sin\theta \tag{19}$$

$$y_t = \frac{-a^2\sin\theta(x_s\sin\theta + y_s\cos\theta) - b^2\cos\theta(x_s\cos\theta - y_s\sin\theta)}{\left(b^2(x_s\cos\theta + y_s\sin\theta)^2 - a^s(x_s\sin\theta - y_s\cos\theta)^2\right)^{1/2}} + c\cos\theta$$

The differential equations in (19) were developed for flat terrain, and thus to account for slope surface plane, $x_s$ and $y_s$ can be adjusted as follows:

$$x_s = (x_{i-1} - x_{i+1}) \pm D_i\sin\omega_i \tag{20}$$

$$y_s = (y_{i-1} - y_{i+1}) \pm D_i\cos\omega_i$$

where $(x_i, y_i)$ denotes the location of a wildfire vertex on a two-dimensional plane, $\omega_i$ is the aspect in radians direction of the $i^{th}$ vertex, and $D_i$ is the difference between the distances measured for the perimeter segment between $(x_{i-1}, y_{i-1})$ and $(x_{i+1}, y_{i+1})$ and i calculated by:

$$D_i = \left[(x_{i-1} - x_{i+1})^2 + (y_{i-1} - y_{i+1})^2\right]^{1/2}\cos\delta_i(1 - \cos\phi_i) \quad (21)$$

where $\phi_i$ is the local slope in radians in the direction of $\omega_i$, and $\delta_i$ is the difference between the aspect direction and the orientation angle of the perimeter segment as referenced on the coordinate system of the surface plane. Now, $\delta_i$ is calculated by:

$$\delta_i = \tan^{-1}\left(\frac{\tan(\omega_i - \alpha_i)}{\cos\phi_i}\right) \quad (22)$$

where $\alpha_i$ is the orientation angle of the perimeter segment on the horizontal plane:

$$\alpha_i = \tan^{-1}\left[\frac{(y_{i-1} - y_{i+1})}{(x_{i-1} - x_{i+1})}\right] \quad (23)$$

To transform from a slope plane back to a horizontal flat lane, a reverse procedure could be performed.

For the wind vector $\theta$ in equation (19), the angle of the resultant wind-slope vector for the direction of maximum fire spread, one can use equation (16) and (17) in the Rothermel model's parameters. The remaining parameters of equation (19) are a, b, and c, the constants describing the shape of an elliptical fire produced at a given vertex. The length to breadth ratio of elliptical fire growth may be identified as follows:

$$LB = 0.936e(0.2566U) + 0.461e(-0.1548U) \quad (24)$$

where U is the wind velocity at midflame height. Assuming the rear focus is near the fire ignition point, the head to back ratio can be found by:

$$HB = \frac{LB + \sqrt{LB^2 - 1}}{LB - \sqrt{LB^2 - 1}} \quad (25)$$

With equations (24) and (25), a, b, and c could be found by:

$$a = \frac{\frac{1}{2}R + \frac{R}{HB}}{LB} \quad (26)$$

$$b = \frac{R + \frac{R}{HB}}{2}$$

$$c = b - \frac{R}{HB}$$

where R denotes the fire rate of spread. Using the Rothermel model, a wildfire could be either a crown fire or a surface fire, with its behaviors drastically different in each case. Typically, this knowledge is known before simulation of spread. Provided a wildfire is a surface fire, a transition probability could be used to simulate the chance the fire becomes a crown fire.

Given the set of equations (14) to (26) and the required inputs, one could develop the software for (1) live wildfire spread prediction for the next time period and (2) simulation of potential eventual wildfire spreads by simulating or forecasting time-variant inputs. The former software could be seen as a subroutine in the latter. Farsite, a well-known software used widely in practice, was developed to solve the common challenges found in wildfire spread prediction using live data, which include weather interpolation and extrapolation using historical patterns, constant fuel moisture re-calculation and update, and extracting complex raster data input. It is also worth noting that under the assumptions of Huygen's principle, the fire front gradually expands from one single ignition point i.e. one fire vertex to multiple fire-front fire vertices until either successful fire suppression, the wildfire reaching a non-conductive geographical area, or the occurrence of fire-hindering weather conditions.

FIG. 1K illustrates Algorithm 3 for simulating wildfire spread with Rothermel's model and Huygen's principles. Though the wildfire spread algorithm pseudo-code seems straightforward to implement, in practice, each subroutine is complex and requires meticulous calibration and calculation. Therefore, Farsite, BehavePlus, and other software are highly regarded in the field as they are able to overcome these great computational hurdles. However, they do so with a sacrifice in speed and robustness. Required data input for these software are often sizable, the dimension of inputs remains large, and the data are often erroneous and outdated due to the high cost of maintenance and regular updates. For minute-by-minute to hourly prediction, these software remain the most reliable tool in wildfire protection. Nevertheless, for insurance simulation where thousands to millions of wildfires must be simulated, these software might not be suitable due to the mentioned caveats.

Neural networks (NN) are mathematical models inspired by the organization and functioning of biological neurons. As neural networks became popular in practice, it was shown to possess significant advantages against the common statistical methods that predated it. For example, it has been shown mathematically that neural networks are universal function approximators such that they can automatically approximate whatever functional form best characterizes the data. Furthermore, it has been shown that artificial neural networks are able to automatically, at least partially, transform the input data. Inherently non-linear, neural network can both estimate non-linear functions and extract any residual non-linear elements from the data after linear terms are removed. With these characteristics, neural networks are also prone to overfitting. Rigorous attempts have been made to analyze the inner workings of neural networks. For instance, a method to explain the predictions of any classifier in an interpretable and faithful manner has been introduced.

Given inputs X and classification (regression) output(s) $Y_k$, where k are encoded 0-1 variable for k-th class in a multi-class classification problem, derived features $Z_m$ are created from linear combinations of the inputs, and then the target $Y_k$ is modeled as a function of linear combinations of the $Z_m$ as follow to create a neural network with one hidden layer Z:

$$Z_m = \sigma(\alpha_{0m} + \alpha_m^T X),\ m = 1, \ldots, M \tag{27}$$
$$T_k = \beta_{0k} + \beta_k^T Z,\ k = 1, \ldots, K$$
$$\text{f\_k}(X) = \text{g\_K}(T),\ k = 1, \ldots, K$$

where $Z=Z_1, Z_2, \ldots, z_M$ and $T=T_1, T_2, \ldots, T_K$. It is straightforward to add additional hidden layers $$Z_{im} = \sigma_i(\theta_{i0m} + \theta_{im}^T z_{i-1}),$$

i=1, . . . , N and adjust the final output later to $$T_k = \beta_{0k} + \beta_k^T Z_N,$$

k=1, . . . , K to create a multi-layer neural network and increase the level of model complexity. As the number and complexity of the inputs increase, the model can benefit from higher number of layers, but potentially at the expense of simultaneously increasing model bias through overfitting.

The popular activation functions σ(v) to be used for neural networks include the sigmoid function $$\sigma(v) = \frac{1}{1 + e^{-v}},$$

tanh function, and linear function. In addition, recent research finds the rectified linear activation unit, or ReLU, σ(v)=max(0, x) to provide better convergence rate when the number of hidden layers is large, i.e. in "deep" neural network. The output function $g_K(T)$ can be the linear function, sigmoid function, identity function, or softmax function $$g_k(T) = \frac{e^{T_k}}{\sum_{l=1}^{K} e^{T_l}}$$

for the k-class classification problem.

To train the set of parameters to equation (27), denoted θ, we minimize a loss function, which can be sum-of-squared errors:

$$R(\theta) = \sum_{i=1}^{N} \sum_{k=1}^{K} (y_{ik} - f_k(x_i))^2$$

for regression problems or cross entropy for multi-class classification problems:

$$R(\theta) = -\sum_{i=1}^{N} \sum_{k=1}^{K} y_{iklog} f_k(x_i).$$

To minimize R(θ), gradient descent is usually used, and the process is termed "back-propagation" in this setting. Due to the construction of the neural network, the gradient could be easily derived using the chain rule. The training of a neural network is computed using a forward and backward sweep that keeps track of weights of each neural network node. It can be assumed, for the sake of simplicity of notation, that the neural network only has one hidden layer, and note that adding an arbitrary number of hidden layers is a straightforward extension by adding additional chain rule terms of every preceding layer. For mean square error loss, the loss function becomes:

$$R(\theta) = \sum_{i=1}^{N} R_i = \sum_{i=1}^{N} \sum_{k=1}^{K} (y_{ik} - f_k(x_i))^2 \tag{28}$$

From $$z_{mi} = \sigma(\alpha_{0m} + \alpha_m^T x_i) \text{ and } z_i = (z_{1i}, z_{2i}, \ldots, z_{Mi}),$$

we can derive the derivatives:

$$\frac{\partial R_i}{\partial \beta_{km}} = -2(y_{ik} - f_k(x_i))g_k'(\beta_k^T z_i)z_{mi} \tag{29}$$
$$\frac{\partial R_i}{\partial \alpha_{ml}} = -\sum_{k=1}^{K} 2(y_{ik} - f_k(x_i))g_k'(\beta_k^T z_i)\beta_{km}\sigma'(\alpha_m^T x_i)x_{il}$$

And gradient descent at every $(1+r)^{th}$ iteration can be found by:

$$\beta_{km}^{(r+1)} = \beta_{km}^{(r)} - \gamma_r \frac{\partial R_i}{\partial \beta_{km}^{(r)}} \tag{30}$$
$$\alpha_{ml}^{(r+1)} = \alpha_{ml}^{(r)} - \gamma_r \frac{\partial R_i}{\partial \alpha_{ml}^{(r)}}$$

where $\gamma_r$ is a learning rate. Now, we can rewrite the differentials in (29) as follows:

$$\frac{\partial R_i}{\partial \beta_{km}} = \delta_{ki} z_{mi} \tag{31}$$
$$\frac{\partial R_i}{\partial \alpha_{ml}} = s_{mi} x_{il}$$

Quantities $\delta_{ki}$ and $s_{mi}$ are respectively errors from the current model at the output and hidden layer units and satisfy $$s_{mi} = \sigma'(\alpha_m^T x_i) \sum_{k=1}^{K} \beta_{km} \delta_{ki} \tag{32}$$

which is known as the back-propagation equation. Using this equation, (30) is implemented with a two-pass algorithm including a forward pass and a backward pass. In the former, the current weights are fixed and the predicted values $\hat{f}_k(x_i)$ are computed from (32). In the latter, the errors $\delta_{ki}$ are computed, and then back-propagated via (32) to give the errors $s_{mi}$. Both sets of errors are then used to compute the gradients for the updates in (30) using (31).

Due to multi-layer neural networks' ability to learn complex, high-dimensional, and non-linear patterns from large data sets, they were obvious candidates for image recognition tasks. However, typical images are large, usually with hundreds of pixels, with each pixel representing an input variable. It implies that a fully-connected first layer with one hundred hidden units in the first layer would contain several tens of thousands of node weights. Such a large number of parameters increases the capacity of the system and thus requires a larger training set. Similarly, the system would run into both hardware problems and convergence problems since it requires large memory. An even bigger problem for using an unstructured neural network for image applications may be that such networks have no built-in invariance with respect to translations and local distortions of the inputs, and hence are not generalizable, which leads to poor performance in practice.

To overcome the mentioned caveats of using multi-layer neural networks in image recognition task, a convolutional neural network (CNN) called LeNet-5 was introduced for recognizing characters. In this section, LeNet-5 may be used as an example to explore the topic of convolutional neural network. There have been constant advances in CNN technology, with new architectural inventions that keep improving the state-of-the-art performance. Yet, LeNet-5 remains important as it is the foundation of all later CNNs. The understanding LeNet-5 is critical for the study of CNNs and of other complex architectures that succeed it.

Figure 1L:
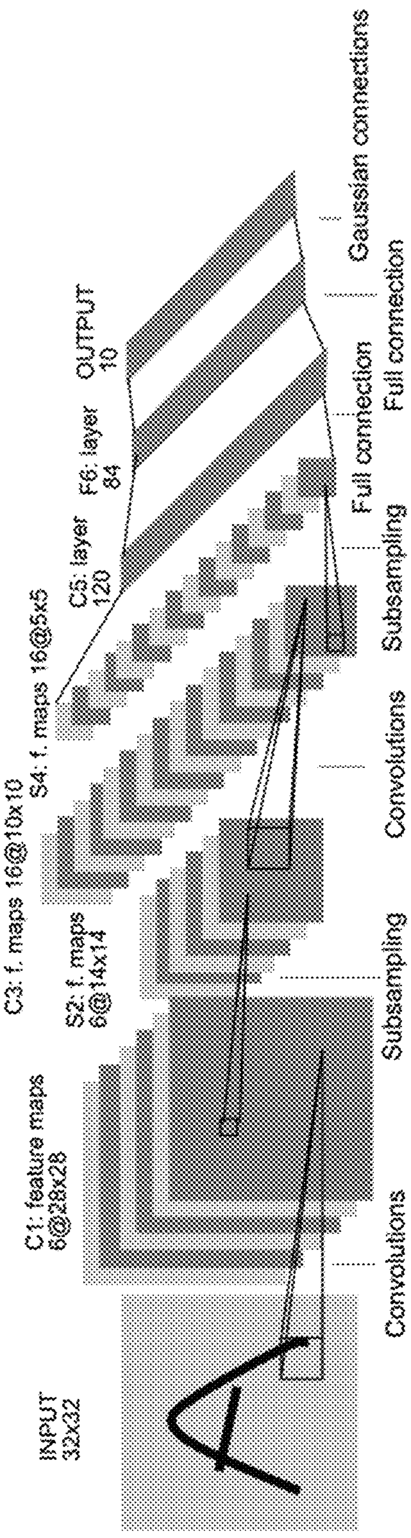
FIG. 1L illustrates a LeNet-5 machine learning architecture for digit recognition according to various embodiments disclosed herein.

Theoretically, convolutional neural networks combine three architectural ideas namely local receptive fields, shared weights, and spatial or temporal subsampling to make sure that shift, scale, and distortion variance could be captured to some degree. FIG. 1L represents the architecture of LeNet-5, in which the building blocks of all CNNs are found. First, the input plane receives images; then each unit in a layer receives inputs from a set of units located in a small neighborhood, also called local receptive fields, in the previous layer. With this setup, neurons (nodes) are able to extract visual features such as oriented edges, end-points, and corners. Subsequently, the extracted features are combined by the succeeding layers to detect higher-order features.

Now, useful feature detectors on one part are likely useful across the entire image. CNNs achieve knowledge sharing by forcing a set of units, whose receptive fields are located at different places on the image, to have identical weight vectors. Units in a layer are organized in planes; and in these planes all the units share the same set of weights and perform the same operation on different parts of the image. The set of outputs of these units is called a feature map. A complete convolutional layer consists of several feature maps. With this set up, several features are extracted at each location.

To illustrate how convolution works, we use the first layer of the LeNet-5 architecture in FIG. 1L. Units in the first layer are organized in six planes, each of which is a feature map. Each unit in a feature map has 25 inputs connected to a 5-by-5 area, also called a receptive field, in the input. Each unit has 25 inputs, and thus 25 weight coefficients plus a bias term. With six planes each projecting to a 5-by-5 area, we see that the receptive fields of neighboring units in FIG. 1L overlap. This is generally the case in CNNs, and the width of overlaps depends on the CNN's own architecture. To reiterate important points: all the units in one feature map have the same weights and bias terms, thereby detect the same feature at all locations of the input; and all feature maps have different sets of weights and consequently extract different types of local features. The convolutional layers have the ability to shift if the input image is shifted, and thus allow the neural networks to be robust to shifts and distortions of the inputs.

The next important type of layer in a convolutional neural network is the sub-sampling layer, also known as the pooling layer. In a sub-sampling layer, feature maps are processed by a list of operations to reduce the resolution of the feature map and consequently reduce the sensitivity of the output to shifts and distortions. The sub-sampling layer is important because precise location of pixel data is irrelevant for identifying the pattern, and even worse could hinder training because input data positions are likely to vary widely for different data instances. It follows that the sub-sampling layer also helps reduce overfitting.

The second hidden layer of LeNet-5 is a sub-sampling layer. It consists of six feature maps, with each corresponding to a feature map in the previous layer. The receptive field of each unit is a 2-by-2 area. Each unit computes the average of its four inputs, then multiplies the average by a trainable coefficient, then adds a trainable bias, and finally passes the result to a sigmoid function. For LeNet-5, successive layers of convolutions and sub-sampling are alternated. At each layer, the number of feature maps is increased as the spatial resolution is decreased.

After a series of successive convolution layer and sub-sampling layer operations, the feature map gets flattened and becomes one or more inputs to a multi-layer neural network, whose layer is called a fully-connected layer in this context. In LeNet-5, these include the C5 and F6 layers. This returns to the realm of the previous section on neural network operation. Convolutional neural networks are trained in the same way as a regular multi-layer neural network: by back-propagation.

Since the early 2000s, which marked the beginning of an era of rapid growth in computational capacity and satellite imagery technology, there have been exciting results from the literature that investigates the application of neural networks and/or satellite imagery for wildfire management. As early as 2004, two years after the launch of MODIS Aqua and five years after the launch of MODIS Terra, NASA trained neural networks to learn the signatures of wildfires in remotely sensed data with the goal of automating the wildfire detection process, using a combination of Geostationary Operational Environmental Satellite (GOES), Advanced Very High Resolution Radiometer (AVHRR), and Moderate Resolution Imaging Spectroradiometer (MODIS) satellite sensors sample data.

NASA uses satellite images during the time of active wildfires and add random non-fires images to have a positive:negative ratio of approximately 1:1, and performs training on 25,713, 43,758, 73,010 and 53,922 spatial pattern samples for MODIS, AVHRR, GOES-EAST and GOES-WEST respectively. The training is performed using cross-validation and early stopping to avoid over-fitting. For validation and test, the data for each instrument were divided into four quarters, each being representative of the entire data set. Training samples take 50% of the data, validation sets take 25% of the data, and the rest is used as a test set.

NASA provides plenty of insights for future experiment design. First, NASA finds that the problem of missing and/or misaligned data limits the overlap between the sensors. Second, it faces a computational problem due to the size of the network when three input images feed to one single neural net, even when the images are only 7-by-7 pixels. To solve these issues, the research divides processing between three separate independent networks. This architectural division works well, and further implies that more sensors may be experimented. Moreover, it follows that if each individual model yields impressive performance, their separate predictions could be used as inputs for an ensemble potentially with superior predictive power. In this case, each neural network can be viewed as a feature extraction model that produces a wildfire indication index.

The result of NASA is promising. All three neural networks that feed from different types of satellite image data achieve accuracy, recall, and precision of higher than 80%. However, the researchers assert that, for fully-automated wildfire detection in real life applications, only the MODIS model satisfies the reliability criteria. They recommend applications of more advanced techniques to improve the predictive performance of all the experimented models.

While NASA samples data to retain the 1:1 ratio between the positive and negative class, another implementation trains deep neural networks on a set of imbalanced data to classify wildfire pixels and non-wildfire pixels. The area of study is a large wild land area in Alaska that is bounded to the north by the Brooks Range and to the south by the Yukon-Tanana uplands and Alaska Range, which experienced a record number of large wildfires in 2004, and motivates the research.

The MODIS satellite products used in this other implementation include the MOD09A1 and the MOD11A2 products. The former contains seven bands, parts of which could be used to compute the normalized difference vegetation index (NDVI) and enhanced vegetation index (EVI); and the latter contains land surface temperature (LST) and emissivity data. Data processing and transformation are required to ensure that the images have the same resolution and that images' pixels are properly lined up. Thus, for each training data point, which represents a pixel location in the area of study, there are eight variables from each single satellite band plus computed vegetation indices from the MOD09A1 satellite product. The target variables are binary classification variable denoting involvement of wildfire in the time period.

By predicting fire pixels, the resulting models of this other implementation are capable of re-creating wildfire maps for a fixed period of time. Also, this other implementation illustrates the issue of low precision in wildfire detection training when there is imbalanced training data. This issue typically arises from the models being conservative and picking up excessive false positives. Regardless, the results from this other implementation are promising, and signifies the usefulness of MOD09A1 and MOD11A2 satellite products in predicting wildfires. The study recommends the use of convolutional neural networks for generating feature vectors to help with overfitting and the use of sequential deep learning architectures for image preprocessing could help with more accurate satellite image data inputs.

While NASA and the other implementation study models that identify active wildfires, a third implementation analyzes the factors contributing to wildfire ignition by using sensitivity analysis of a neural network, and contributes to the feature selection process of later studies including ours. The study groups wildfire factors, which are listed in FIG. 1M, into three large index groups: Fire Weather (FW), Fire Hazard (FH), and Fire Risk (FR). Some of the variables in Fire Hazard Index (FHI) in the third implementation are closely related to the Rothermel model. In the following discussion, we discuss the third implementation as well as the factors identified as major drivers of wildfire ignitions.

Weather is unarguably a critical element of the fire environment. Under certain conditions, such as when a threshold level of fuel presence and continuity is reached, weather has more influence than topography and vegetation in wildfire ignition. Consequently, we can find a weather component in most wildfire management systems. The third implementation finds that most methods of determining variable importance identify occurrence of rainfall in the previous 24 hours as the most significant weather parameter in ignition prediction. Following rainfall in the order of influence are respectively temperature, wind speed, and relative humidity. Findings suggest that increased summer temperatures and low amounts of rainfall account for high fire potential.

The second group of wildfire factors is fire hazard index, which includes fuel models, 10-hour moisture content, elevation, and terrain aspect. Using feature importance methods including logistic regression, Garson's algorithm, Tchaban's weight product, and partial derivatives, 10-h fuel moisture may be identified as the most influential variable. The drying of the fine dead fuels increases ignition probability and wildfire potential, and conducts an experiment on foliage moisture content assessment using satellite data. Hence, it is not unusual to find that many fire danger estimation systems include 10-h fuel moisture in its computation.

Using partial derivatives, at lower elevations fire danger increases more rapidly, while at higher elevation fire danger tends to become constant and depends more on climatic anomalies. Moreover, length of fire season and fuel vary with elevation due to differences in amount of precipitation received, dates of snow melt, and greening and curing dates of vegetation. Aspect, defined as the direction a slope is facing, affects fire potential through variations in the amount of solar radiation and wind. Because east-facing slopes experience earlier heating and cooling and generally lee sides of mountains, they have lower wildfire potential. On the other hand, south to southwest facing slopes typically have the greatest number of fires and longest fire season due to high solar radiation and vegetation water stress. Last but not least, north-facing slopes could support low frequency but high intensity fire regimes due to more moist and heaviest fuel conditions.

Due to the fact that anthropogenic wildfire risk is different for different geographical locations, the findings around FRI might not be generalizable for all parts of the world. For instance, forest land near power line has been shown to have high wildfire potential under extreme wind conditions, while power lines have been found to have little influence on wildfire risk. Nevertheless, some findings are consistent. For instance, human-caused wildfire risk decreases away from primary and secondary roads, power lines, and urban areas. Similarly, dense human presence close to main roads leads to more possible causes of ignitions by accident or negligence.

Since the advent of LeNet-5, there have been continual developments that generate significant improvements in the study of convolutional neural network. The major extensions to the classic LeNet-5 model have been generally in (1) insertion of neural network depth, (2) inventions of new neural network architectural sub-component, and (3) smart data processing and training techniques to reduce overfitting.

Following our discussion of CNNs, we can readily see that for complex classification problems, increasing the depth of a CNN could improve its performance, as a deeper neural network is more capable in feature extraction of highly non-linear relationship among pixel data. AlexNet, for example, adds a few more layers to LeNet-5, implements data augmentation, and performs weight dropout to train a CNN for ImageNet data set. AlexNet is also the first CNN to use the Rectified Linear Units (discussed in detail below) as its activation functions for the hidden layers. The VGG-16 model, for example, extends the depth of a CNN further to include up to 13 convolutional and 3 fully-connected layers, while using smaller dimension for its feature map size (2-by-2 and 3-by-3). As a very deep network, VGG-16 has 138 million weight parameters, which occupy up to 500 Megabytes of storage space.

As inserting additional hidden layers plateaued in its effectiveness, partly due to the vanishing gradients problem, research sought new architectures that could improve predictive performance. GoogLeNet, also known as Inception network, builds neural networks using dense modules/blocks. Instead of stacking convolutional layers in ways similar to VGG-16 and AlexNet, Inception stacks modules, within which are convolutional layers. GoogLeNet's modular system present a few novel architectural ideas: (1) building parallel towers of convolutions with different filter size that are followed by concatenation, (2) using 1-by-1 convolutions for dimensionality reduction to remove computational bottlenecks, and (3) using auxiliary classifiers to increase discrimination in the lower stages of the classifier, thereby increase the gradient signal that gets propagated back, and to simultaneously provide additional regularization. Similarly, to improve the training of deep convolutional neural networks, ResNet-50, for example, applies the skip connection technique through the use of identity blocks, also known as residual blocks, and batch normalization of data. Furthermore, using a combination of the above concepts that enable the training of deep neural networks without the caveats, newer popular models are able to challenge the performance of the state-of-the-art model and constantly advance the research in the field of image recognition.

With a constantly growing set of architectural components and techniques, data scientists encounter a major obstacle in architectural design when facing a new image classification problem, as the training time for one model is often long. A common data science procedure for image classification typically includes training with many popular algorithms such as LeNet-5, VGG-16, Inception v4, ResNet-50, Inception-ResNet, and ResNeXt, and subsequently calibrate the model with the highest performance metrics. In practice, the cost-performance trade off also needs to be taken into consideration, and sometimes a lighter model could be chosen if it underperforms the best performing models by an acceptable margin. However, if the training pipeline involves training a large number of individual usable models, perhaps for the purpose of ensembling, this method could become costly and time-consuming. Moreover, manually developed architectures have been known to be time-consuming and error-prone in practice. Neural architecture search, a technique of algorithmic and automated architecture engineering, has gained popularity in the recent years as a reliable solution for these issues. The basic components of neural architecture search algorithms are described in greater detail below.

Figure 1N:
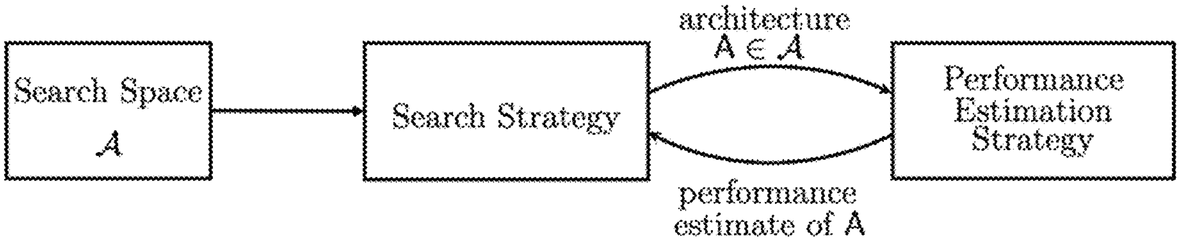
FIG. 1N illustrates components of a neural architecture search method according to various embodiments disclosed herein.

A general neural architecture search algorithm, as illustrated in FIG. 1N, consists of three components: a search space, a search strategy, and a performance estimation strategy. The search space defines which architectures can be represented. Generally, the search space includes the following parameters: (1) the number of layers, (2) the type of operation each layer performs such as sub-sampling, skip connection, traditional convolution layer, depth-wise separable convolutions, and dilated convolutions, (3) hyperparameters of each operation such as the number of filters, size of each filter, stride for a convolutional layer, units of full-connected networks. Clearly, (3) is conditional on (2).

Motivated by hand-crafted architectures consisting of repeated motifs, one implementation searches for such motifs, dubbed cells or blocks, respectively, rather than for whole architecture. This implementation optimizes two kinds of cells, namely a normal cell that preserves the dimension of the input and a reduction cell that reduces it. The final output is an architecture built by stacking these cells. This method has been shown to reduce the search space, and hence improve training speed, and generalize easier to different data sets. The architecture of cells is called a micro-architecture and the architecture of a model constructed from stacking cells is called a macro-architecture. Ideally, both the macro-architecture and the micro-architecture should be optimized jointly. Another implementation introduces hierarchical search space for the optimization of macro-architectures. The definition of the search space determines the complexity of the optimization problem as well as the potential complexity of the final optimized model.

The second component of a neural architecture search algorithm is a search strategy. Many popular optimization techniques such as Bayesian optimization, evolutionary methods, reinforcement learning (RL), and gradient-based methods have been used as parts of a search strategy, all with certain degrees of success. As this topic spans a wide range in the domain of optimization, we refer to one implementation for a more detailed description of the body of research in this field, and offer a brief summary of the components of a search strategy. Essentially, the goal of a search strategy is to efficiently search for and select architectures in the search space that would optimize a pre-determined performance metrics returned by the performance estimation strategy. Provided a search space, we can readily create a huge set of possible permutations, and subsequently train all of said permutations to select the best architecture, though this process is extremely inefficient and likely time-consuming.

Based on the goal of a search strategy, it is straightforward to see why reinforcement learning (RL) is a good choice for neural architecture search experiments. For instance, NasNet, using a neural architecture framework based on RL and recurrent neural network (RNN), was able to become the state-of-the-art model for the ImageNet data set at the time of this writing. Briefly, in its NAS framework, NasNet uses a controller RNN that predicts filter height, filter width, stride height, stride width, and number of filters for one layer. The predictions of the RNN then become the inputs for the next steps, where the proposed CNNs are trained and yield an accuracy metric to be used as a reward for the RL task. The RL agent's task is to keep track of the RNN's parameters as well as their scores for the suggestion of the ultimate architecture, which is obtained when the RL agent converges.

Lastly, a performance estimation strategy determines the performance metrics that the search strategy uses and how best to attain those metrics. The simplest method is training any architecture A to convergence and evaluating its performance with the validation data. However, this method can be time-consuming if the search space and training data set are large. Naturally, this issue leads to development of methods that speed up performance estimation. There are four classes of methods that could speed up the performance estimation process, namely lower fidelity estimates, learning curve extrapolation, weight inheritance/network morphisms, and one-shot models/weight sharing.

First, performance can be estimated based on lower fidelities of the actual performance. Lower fidelity estimation methods include: reducing the number of training epochs, training on a subset of the data, and training on images of lower-resolution. While low-fidelity approximations shorten training time, they introduce some bias as the performance is likely underestimated. Such problem might not affect the ultimate architecture output as long as the relative ranking remains stable. However, this relative ranking can change dramatically if the difference between the approximations and the true performance metrics is too large, and argue for incremental increase in fidelity during training.

Second, we can estimate performance using learning curve extrapolation, and stop those forecasted to perform poorly to speed up the architecture search process. Training separate surrogate models to predict the performance of novel architectures has been proposed. However, this method faces a variance problem for the reason that predictions of later architectures need to be made based on relatively few earlier evaluations.

Third, another approach to speed up performance estimation is using pre-trained weights from other architectures that have been trained to convergence. For example, network morphisms, which allows an architecture to be modified without changing the function represented by the network, has been studied. This method allows a neural architecture search algorithm to increase the capacity of the architecture successively while retaining the high performance without starting the training from scratch. While this implies that network morphism approaches allow search spaces to be theoretically boundless, strict network morphisms can only make architectures larger and may lead to overly complex architectures. Besides network morphism, one-shot architecture search has also received attention for its effectiveness. One-shot architecture treats all architectures as different subgraphs of a supergraph and shares weights between architectures that have edges of this supergraph in common. Thus, only the weights of a single one-shot model are trained, and architectures can be evaluated without separate training by inheriting trained weights from the one-shot model. Because no training is required, one-shot architecture dramatically speeds up performance estimation. However, one-show model may create a large bias as it underestimates the actual performance of the best architectures. It has also been argued that the estimation would remain accurate if the estimated performance is highly correlated with the actual performance, as only the ranking of architectures needs to be accurate for neural architecture search to work.

Artificial swarm intelligence (ASI) technology has shown great promise as a method to substantially improve collective insights and significantly increase predictive accuracy of groups. ASI views intelligence and decision-making as a function of social interactions between group members. It draws motivation from the study of social animals such as ants, bees, termites, and schooling fish, who as individuals are simple but are intelligent as groups. Three principles are required to create a successful artificial swarm intelligence system for prediction tasks.

First, a researcher needs to create a system of members that work individually and have unique experience to predict a common objective separable into parts. Being autonomous, each member is not directly controlled and influenced by other members. The researcher is tasked with the distribution of workload so that the swarm members do not divide the workload by themselves. After the problem is set up, the individual swarm members subsequently process their subproblems and make contributions to solving the global problem.

Second, each member in a swarm should be simple, fast, and have limited perspective with respect to the cumulative amount of information known to the entire swarm. The limited information allows each swarm to make decisions quickly and consistently without worrying too much about the big picture. This principle allows swam with many members to compute quickly, while maintaining the heuristic nature to drive high level of performance.

Third, the swarm members should have a simple and indirect method of communication with each other. Although individual members act alone and not under direct control of others, they should communicate in order to adjust and achieve the global goal. The chosen mode of communication should be simple for the second principle to hold. This communication could be done by (1) "stigmergy," which happens when a swarm member alters the common environment and allow other members to receive the message via the environment and adjust their own behaviors, and (2) swarm member changing its own state, which is observed by other swarm members. Direct communication between swarm members is against the first principle, and if performed complicates member design by requiring members that have message sending and receiving capability, which is undesirable in the context of learning through heuristics.

Figure 1O:
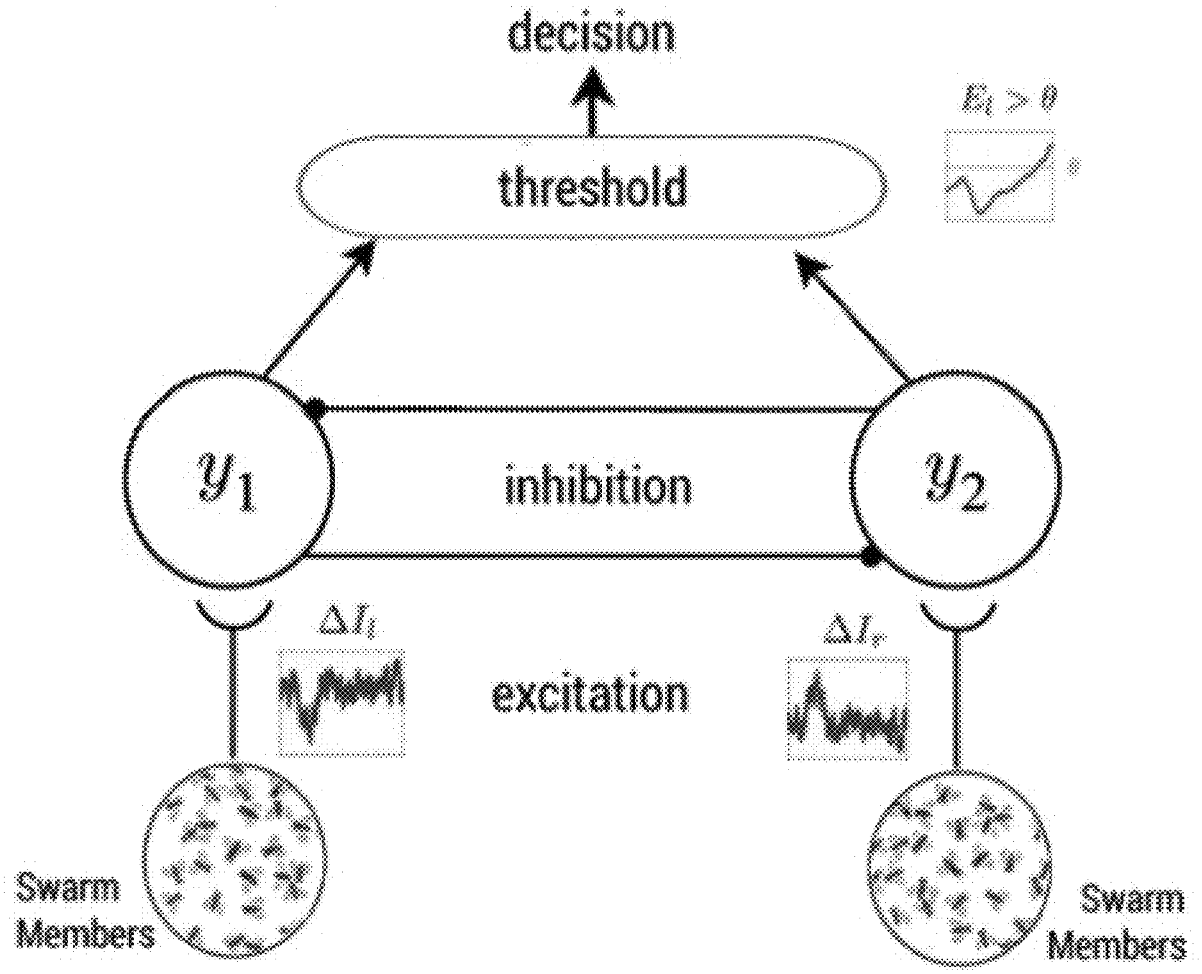
FIG. 1O shows an artificial swarm intelligence decision network according to various embodiments disclosed herein.

A common framework for swarm decisions is the Usher-McClelland model, also known as the Leaky Competing Accumulator (LCA), which was originally developed to describe the processes of leaky accumulation and competition observed in neuronal populations during choice tasks. For the Usher-McClelland model, in the context of swarm intelligence, $y_1$ and $y_2$ denote activity levels of the swarm. These levels describe the states of accumulator units, illustrated by the circles surrounding $y_1$ and $y_2$ in FIG. 1O. These accumulator units are modelled as leaky integrators, whose leak rate is governed by a constant of inhibition, denoted k. Each accumulator unit integrates evidence from the swarm with mean activity $I_i$ and independent white noise $dW_i$, which follow independent Wiener processes, of amplitude $c_i$. Mathematically, the information is accumulated using the following equation:

$$\begin{aligned} dy_1 &= (-ky_1 - wy_2 + I_1)dt + c_1 dW_1 \\ dy_2 &= (-ky_2 - wy_1 + I_2)dt + c_2 dW_2 \end{aligned} \tag{33}$$

where it is assumed that integration starts from $y_1(0)=y_2(0)=0$. In (33), constant k represents the decay rate of the accumulators' activity, i.e. the leak, and w denotes the mutual inhibition. In making a unified swarm decision, the terms in equation (33) are computed iteratively until a threshold is reached for a final decision of either $y_1$ or $y_2$.

Using neural networks to study nonlinear patterns that contribute to ignition wildfires for Lesvos Island in Greece shows that rainfall, 10-hour fuel content, and month of the year are the most significant variables of the fire weather, fire hazard, and fire risk indices, respectively. The application of neural networks in fire ignition risk estimation is becoming increasingly common, as neural networks are particularly useful for pattern recognition and for modeling complex problems whose explicit form of the relationship among variables is unknown.

Several studies focus on training neural networks on satellite images for estimation of wildfire risk. In one study, a collection of 43 meteorological satellite images is used to detect forest fire hot spots in Hubei Province of China. MODIS imagery and neural network are used in another study to predict forest fire in the Brazilian Amazon while still another study uses Landsat 8 and convolutional neural network to predict the 24-hour spread of wildfire. All of these studies, with relatively high reported accuracy, show promise in utilizing satellite imagery and deep learning for wildfire monitoring. Many of the wildfire ignition factors could be captured by satellite images, and using deep neural network may help with analyzing nonlinear and complex relationship among these factors.

Our study introduces a novel method of using an ensemble of weak leaner convolutional neural networks, whose architecture are optimized by reinforcement learning, for the prediction of wildfire ignition. More generally, we propose a method of building an accurate predictor using many weak learners that take images as inputs.

In one embodiment, Monitoring Trends in Burn Severity (MTBS) Burn Area Boundary and Fire Occurrence Points data sets, which may be maintained by United States Department of Agriculture (USDA) Forest Service, may be used. All fires reported in the MTBS project are greater than 1,000 acres in the western United States and greater than 500 acres in the eastern United States. After selecting only the wildfires with eventual spread greater than 1,000 that occurred after the year 2002, one embodiment includes 5,077 wildfire data points. Each data point may include geometry of wildfire spread, point of ignition, fire name, and other information. In a further embodiment, each data point may also include the latitude and longitude of ignition point in order to facilitate a focus on ignition of wildfires.

In various embodiments, the Moderate Resolution Imaging Spectroradiometer (MODIS) and Landsat imaging products from the National Aeronautics and Space Administration (NASA) may be used for satellite imagery. In one embodiment, a total of 294 imaging NASA products may be examined and one or more of the products may be selected based on a) convergence in training and b) performance better than a coin toss. For example, 33 may be selected for further research. The selection may be done, for example, by training a neural network with a small number of epochs. In one embodiment, products that fail to reduce loss during these epochs may be excluded. Raw images may be processed, for example, by cropping the images to a grid of 50 square miles around the ignition point. The collected images, for example, may have time stamps at most 15 days before the ignition for time-variant images. In various embodiments, some products may have higher resolution than others and the dimensions of the input images may be non-uniform. TABLE I provides a list of satellite products used in various embodiments.

TABLE I

| Product Name | Description |
|---|---|
| ARD TILE | U.S. Landsat 4-8 Analysis Ready Data (ARD) Level-2 Tiles |
| ASTER GED AG100 | ASTER Global Emissivity Dataset 100-meter V003 |
| GFSAD GFSAD30NACE | GFSAD Cropland Extent 2010 North America 30 m V001 |
| LANDSAT ETM C1 | Landsat 7 Enhanced Thematic Mapper Plus Collection 1 Level-1 |
| MODIS MCD19A1 V6 | MAIAC Land Surface BRF Daily L2G Global 500 m and 1 km |
| MODIS MCD19A2 V6 | MAIAC Land Aerosol Optical Depth Daily L2G 1 km |
| MODIS MCD19A3 V6 | MAIAC BRDF Model Parameters 8-Day L3 1 km |
| MODIS MCD43A1 V6 | BRDF/Albedo Model Parameters Daily L3 Global 500 m |
| MODIS MCD43A2 V6 | BRDF/Albedo Quality Daily L3 Global 500 m |
| MODIS MCD43A3 V6 | Albedo Daily L3 Global 500 m |

TABLE I-continued

| Product Name | Description |
|---|---|
| MODIS MCD43A4 V6 | Nadir BRDF-Adjusted Reflectance Daily L3 Global 500 m |
| MODIS MOD09A1 V6 | Surface Reflectance 8-Day L3 Global 500 m |
| MODIS MOD09GA V6 | Surface Reflectance Daily L2G Global 1 km and 500 m |
| MODIS MOD09GQ V6 | Surface Reflectance Daily L2G Global 250 m |
| MODIS MOD09Q1 V6 | Surface Reflectance 8-Day L3 Global 250 m |
| MODIS MOD11A1 V6 | Land Surface Temperature and Emissivity Daily L3 Global 1 km |
| MODIS MOD11A2 V6 | Land Surface Temperature & Emissivity 8-Day L3 Global 1 km |
| MODIS MOD11B1 V6 | Land Surface Temperature and Emissivity Daily L3 Global 5 km |
| MODIS MOD11B2 V6 | Land Surface Temperature and Emissivity Daily L3 Global 5 km |
| MODIS MOD11 L2 V6 | Land Surface Temperature and Emissivity 5-Minute L2 Swath 1 km |
| MODIS MOD13A1 V6 | Vegetation Indices 16-Day L3 Global 500 m |
| MODIS MOD13A2 V6 | Vegetation Indices 16-Day L3 Global 1 km |
| MODIS MOD13Q1 V6 | Vegetation Indices 16-Day L3 Global 250 m |
| MODIS MOD14A1 V6 | Thermal Anomalies & Fire Daily L3 Global 1 km |
| MODIS MOD14A2 V6 | Thermal Anomalies & Fire 8-Day L3 Global 1 km |
| MODIS MOD14 V6 | Thermal Anomalies & Fire 5-Min L2 Swath 1 km |
| MODIS MOD15A2H V6 | Leaf Area Index - Fraction of Photosynthetically Active Radiation 8-Day |
| MODIS MOD17A2H V6 | Gross Primary Productivity 8-Day L4 Global 500 m |
| SP TILE BA | U.S. Landsat 4-8 Burned Area (BA) Landsat Science Product Tiles |
| SP TILE DSWE | U.S. Landsat 4-8 Dynamic Surface Water Extent Landsat Science Product Tiles |
| SRTM V2 | Shuttle Radar Topography Mission 1 Arc and 3 Arc Second Digital Terrain Elevation Data |
| SRTM V3 | Shuttle Radar Topography Mission 1 Arc-Second Digital Terrain Elevation Data |
| SRTM V3 SRTMGL1 | NASA Shuttle Radar Topography Mission (SRTM3) Global 1 arc-second |

In various embodiments, the utility of each MODIS channel may be utilized, for example, for different purposes in wildfire risk estimation. For example, the MODIS channel 1 and channel 2 may usually be applied to detect the burned areas and smoke; while channel 1, 2, 6, 7, 20 to 25, 31, and 32 may be used to detect active fire. In one embodiment, MODIS channels may not be pre-selected, but all relevant NASA products may be trained to filter and include ones that yield meaningful, though not highly accurate, prediction for an ensemble model.

In one embodiment, 15,000 extra data points of areas without wildfire ignitions may be added to a data set. In this embodiment, an approximate ratio of 1:3 may be obtained for fire:no-fire data points. The data points without ignition may be randomly selected, for example, from non-desert areas without a wildfire ignition. In some embodiments, data points from the same areas of wildfire ignition before and after historical ignition year may be added into the no-fire data points.

Convolutional neural network (CNN) is ubiquitous in image classification tasks. For example, researchers for ImageNet classification constantly design successive advancements through architecture engineering to achieve results more impressive than previous results.

Figure 1P:
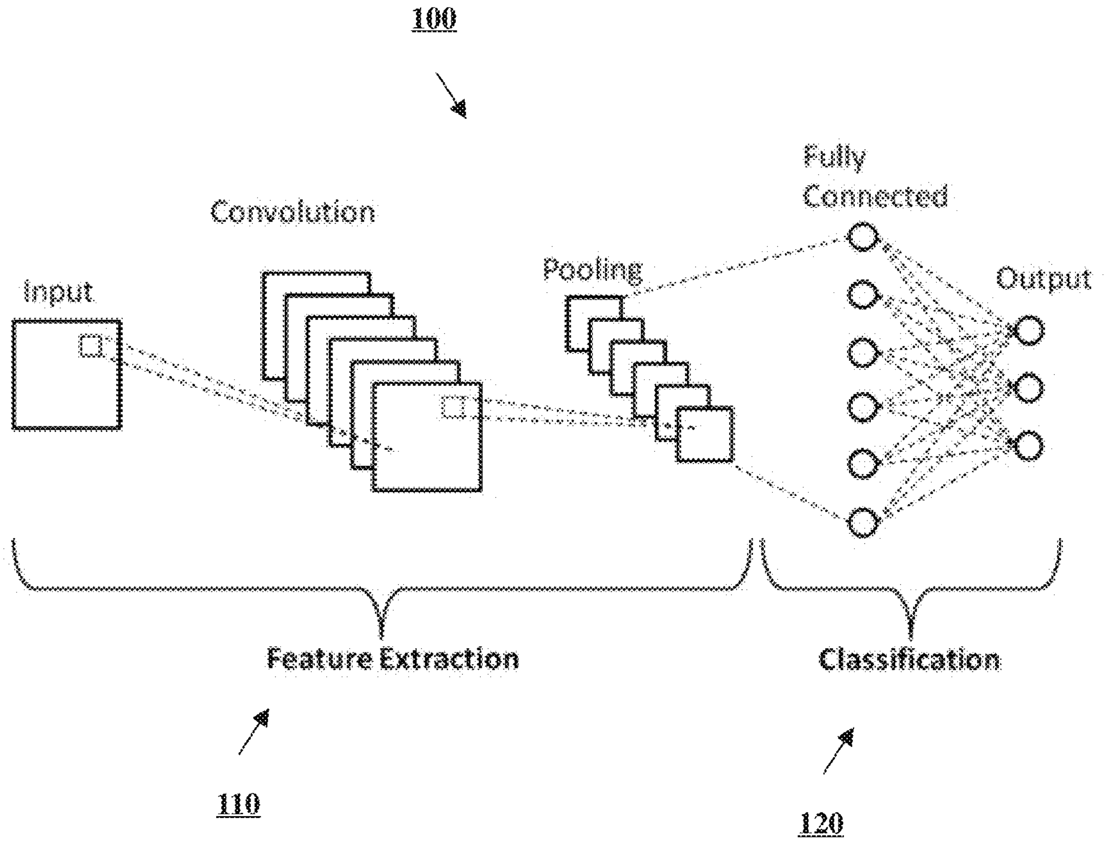
FIG. 1P shows a convolutional neural network architecture according to an embodiment of the disclosed subject matter.
Figure 2A:
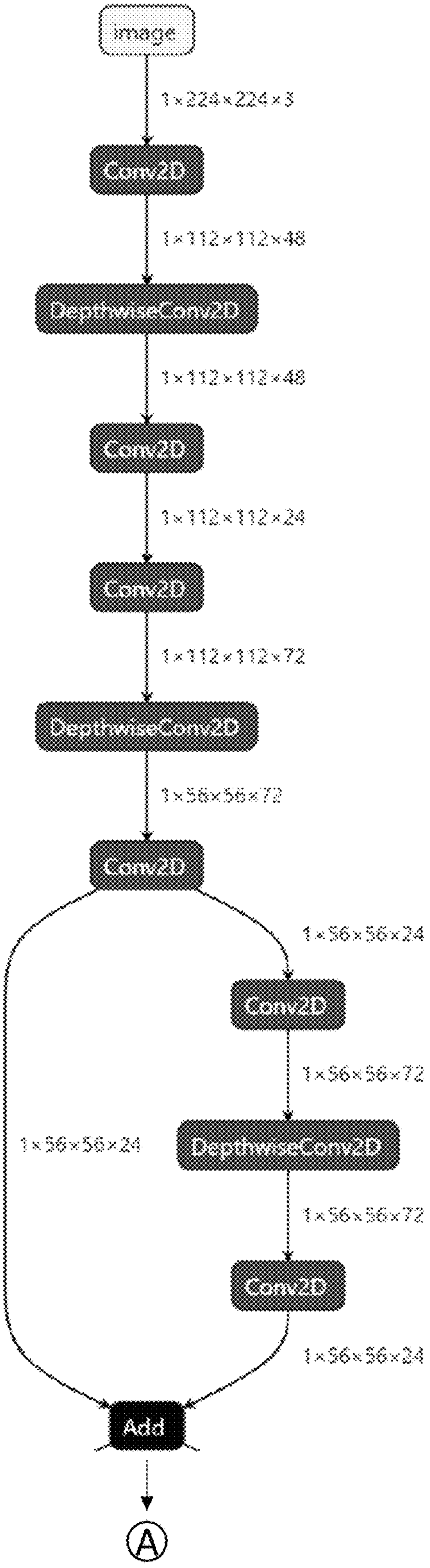
FIGS. 2A-2F show a generated convolutional neural network from a neural architecture search according to an embodiment of the disclosed subject matter.
Figure 2B:
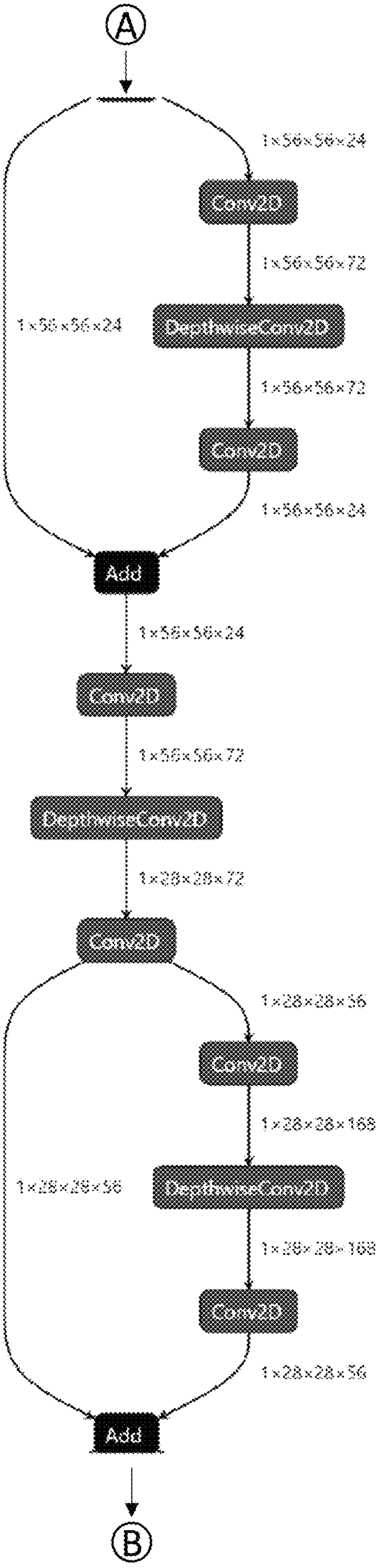
Figure 2C:
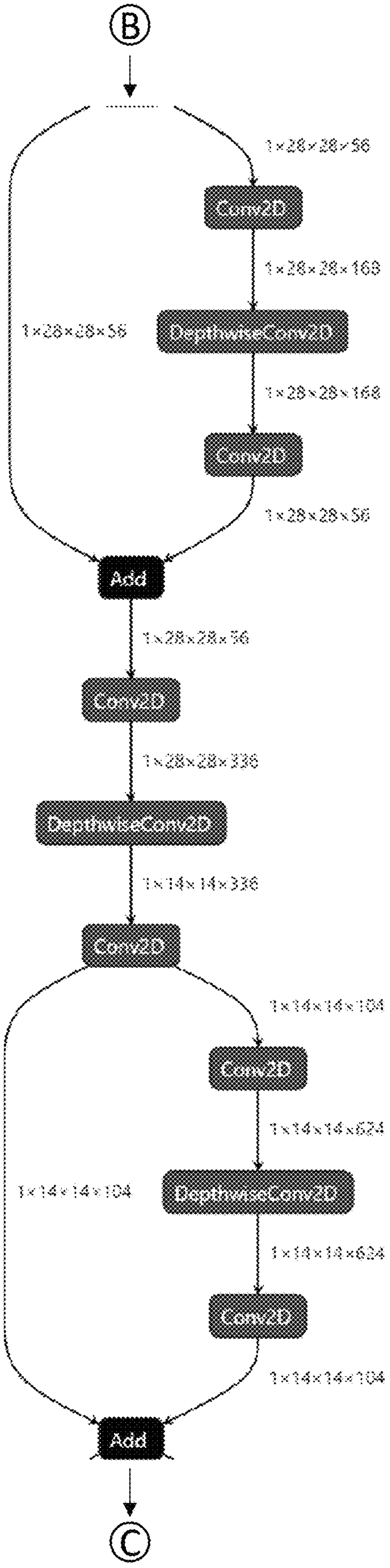
Figure 2D:
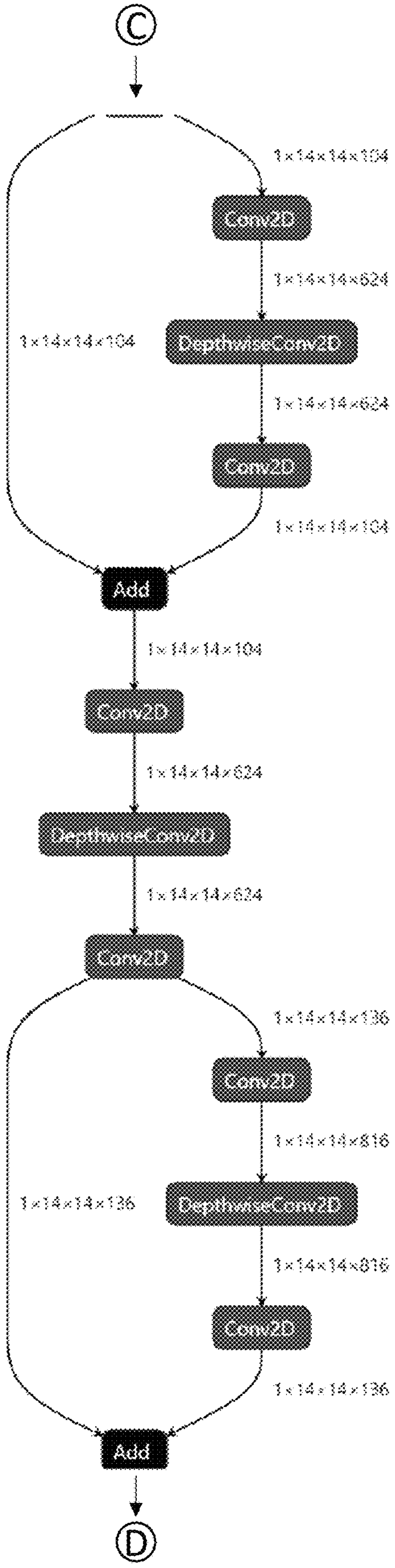
Figure 2E:
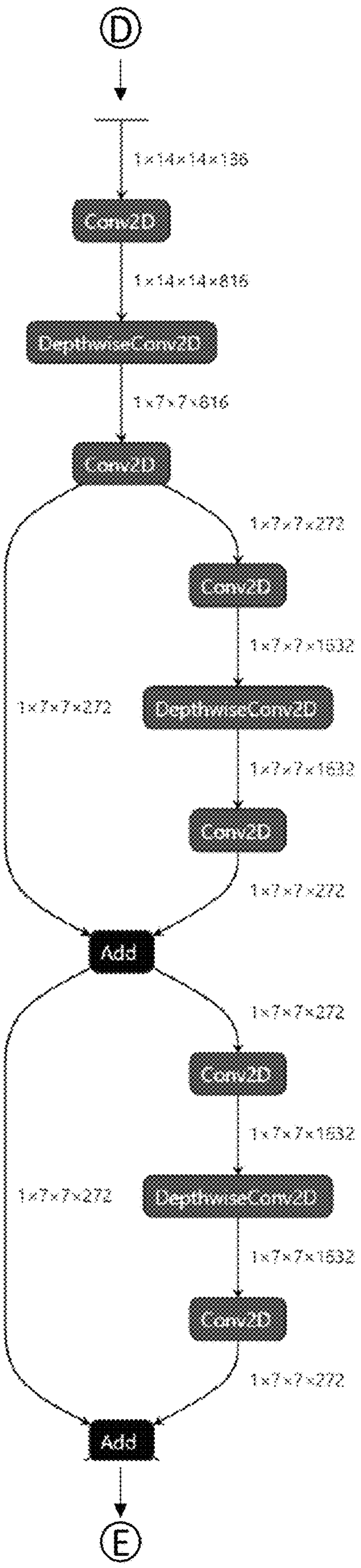
Figure 2F:
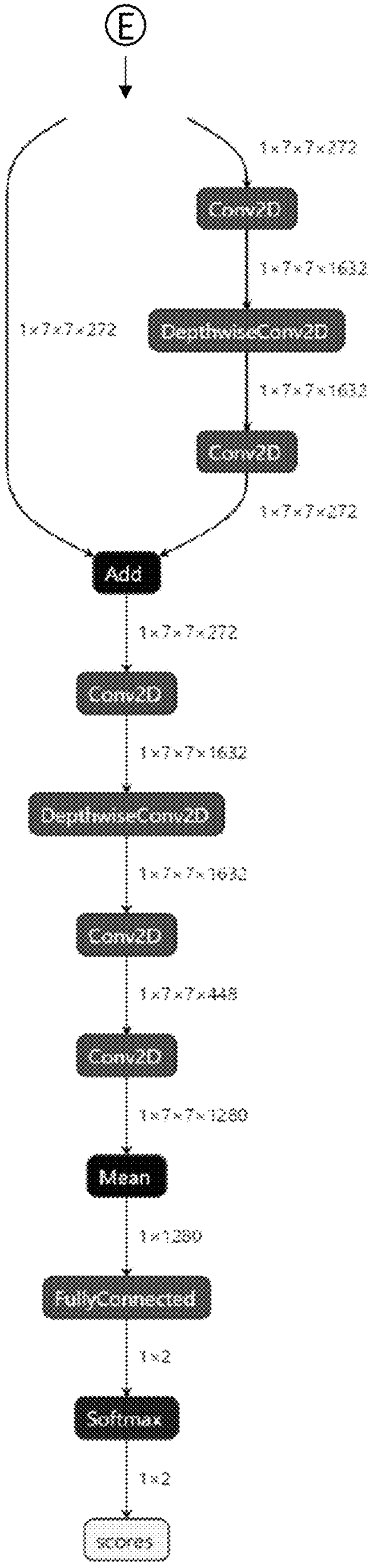

FIG. 1P illustrates an example of a convolutional Neural Network (CNN) 100 according to various embodiments. CNN 100 may include, for example, a feature extraction layer 110 and a classification layer 120. In various embodiments, tweaks and enhancements (such as skip connections or branching layers) may be constantly applied to these layers for enhancement of performance metrics. In designing a new system for a new classification task, it may be difficult to choose which architecture to use as training is often computationally expensive.

Designing an architecture that achieves optimal results for a new problem may be time-consuming. Training multiple models with different inputs, therefore, may need a more efficient approach to derive the optimal architecture for each model. Additionally, transfer learning works well for problems of similar nature but may not generalize for the learning of satellite image features. In one embodiment, a neural architecture search (NAS) framework may be utilized to resolve various issues.

FIGS. 2A-2F illustrate an example of a CNN 200 generated from a NAS framework. For example, a NAS may be able to create a deep neural network that optimizes accuracy for a particular classification task. The example process follows from FIG. 2A to 2B via connection "A", from FIG. 2B to 2C via "B", and so on. In various embodiments, each of 33 CNNs may have different architectures. Using transfer learning, for example, may help improve the speed of NAS.

Figure 3A:
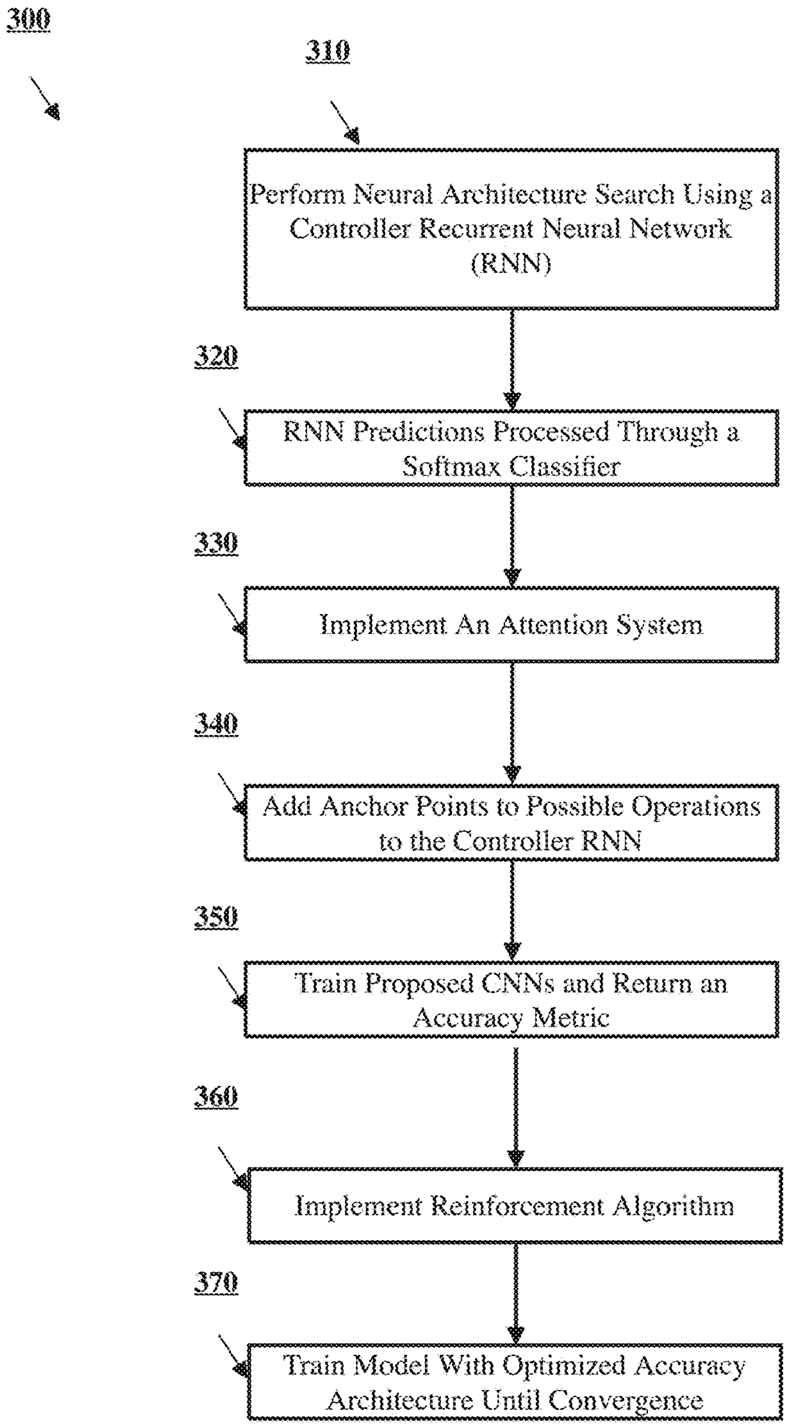
FIG. 3A shows a flow diagram of a method for generating a swarm neural network ensemble according to an embodiment of the disclosed subject matter.

FIG. 3A illustrates a flow diagram of a method 300 for use in generating a swarm neural network ensemble according to one embodiment. The method 300 may be implemented by a processor, such as processor 524 of device 520 of FIG. 5. Although the steps of method 300 are shown in a particular order, this is only for simplicity and steps may be performed in any order, other than as necessary for output of one step to be used in a subsequent step.

In step 310, a neural architecture search may be performed, for example, by using a controller recurrent neural network (RNN). In one embodiment, the controller RNN may predict filter height, filter width, stride height, stride width, and number of filters for one layer.

In step 320, predictions from the controller RNN may be processed through a softmax classifier. The processed predictions may then be utilized as input to one or more of the subsequent steps.

In step 330, an attention system, for example, may be implemented. In step 340, anchor points may be added to the list of possible operations to the controller RNN.

In step 350, CNNs proposed by the controller RNN may be trained and return an accuracy metric. In one embodiment, the accuracy metric may be used as a reward for a reinforcement learning task.

In step 360, a reinforcement algorithm may be implemented to perform a reinforcement learning task.

In step 370, a model may be trained until convergence. In one embodiment, the prior steps may result in an architecture that optimizes accuracy. In this embodiment, the optimized accuracy architecture may be utilized to train the model until convergence.

In various embodiments, separate CNNs that meet selection criteria may be trained. For example, 33 separate CNNs may each predict the same target of wildfire ignition. The output of each of the separate CNNs may than produce, for example, inputs for an ensemble model. In one embodiment, the ensemble model may be a shallow neural network such as a single-layer perceptron or a boosting model. In various embodiments, logistic regression may be used to examine the coefficients of the model. Such analysis may, for example, help identify the importance of each satellite product to the prediction of wildfire ignition. FIG. 4 illustrates an example of a logistics regression analysis 400. In one embodiment, the logistics regression analysis 400 may be produced based on a CNN created by NAS, such as the CNN 200 of FIGS. 2A-2F.

In one embodiment, each single CNN and the ensemble may be trained by splitting the data sets into three sets: training, validation, and test set. The validation test may be used, for example, for hyper parameter tuning and architecture search. The test set may be used, for example, for performance metrics reporting. Each single CNN may be a weak learner and may not perform well in testing. TABLE II shows results for each single CNN in one embodiment. In this embodiment, precision, recall, and F1 score may be obtained using a macro average, as opposed to a weighted average, between two classes. The data may contain, for example, unbalanced classes and therefore reporting macro average is appropriate to reflect overall performance. In various embodiments, more decent performers may include topology satellite model, burned area model, thermal anomalies model, and vegetation index model.

TABLE II

| Model | Accuracy (%) | Precision (%) | Recall (%) | F1 (%) |
|---|---|---|---|---|
| ARD TILE | 77.3 | 68.7 | 56.8 | 56.8 |
| ASTER GED AG100 | 73.0 | 50.1 | 50.0 | 46.8 |
| GFSAD GFSAD30NACE | 52.0 | 59.5 | 62.2 | 51.2 |
| LANDSAT ETM CA | 67.5 | 56.6 | 57.0 | 56.8 |
| MODIS MCD19A1 V6 | 37.6 | 55.4 | 54.7 | 37.5 |
| MODIS MCD19A2 V6 | 76.4 | 66.0 | 53.0 | 50.2 |
| MODIS MCD19A3 V6 | 69.4 | 59.5 | 60.4 | 59.9 |
| MODIS MCD43A1 V6 | 28.3 | 59.0 | 52.3 | 25.6 |
| MODIS MCD43A2 V6 | 26.4 | 56.7 | 51.1 | 23.0 |
| MODIS MCD43A3 V6 | 66.0 | 58.5 | 60.4 | 58.7 |
| MODIS MCD43A4 V6 | 27.4 | 59.2 | 51.9 | 24.4 |
| MODIS MOD09A1 V6 | 33.7 | 59.5 | 55.2 | 32.6 |
| MODIS MOD09GA V6 | 30.2 | 52.0 | 51.0 | 28.9 |
| MODIS MOD09GQ V6 | 30.2 | 52.0 | 51.0 | 28.0 |
| MODIS MOD09Q1 V6 | 29.4 | 50.5 | 50.3 | 28.0 |
| MODIS MOD11A1 V6 | 70.6 | 55.5 | 54.0 | 54.1 |
| MODIS MOD11A2 V6 | 64.1 | 59.0 | 61.8 | 58.6 |
| MODIS MOD11B1 V6 | 70.9 | 57.1 | 55.7 | 56.0 |
| MODIS MOD11B2 V6 | 59.2 | 56.3 | 58.6 | 54.7 |
| MODIS MOD11L2 V6 | 70.6 | 55.5 | 54.0 | 54.1 |
| MODIS MOD13A1 V6 | 82.0 | 75.4 | 76.6 | 75.9 |
| MODIS MOD13A2 V6 | 84.8 | 79.0 | 82.3 | 80.3 |
| MODIS MOD13Q1 V6 | 85.9 | 80.9 | 79.7 | 80.3 |
| MODIS MOD14A1 V6 | 76.4 | 68.4 | 70.0 | 69.1 |
| MODIS MOD14A2 V6 | 69.4 | 62.4 | 65.2 | 62.9 |
| MODIS MOD14V6 | 77.1 | 68.6 | 55.9 | 55.3 |
| MODIS MOD15A2H V6 | 38.9 | 58.5 | 57.1 | 38.8 |
| MODIS MOD17A2H V6 | 55.2 | 63.2 | 66.8 | 54.4 |
| SP TILE BA | 76.8 | 67.7 | 55.0 | 53.8 |
| SP TILE DSWE | 77.1 | 67.8 | 56.8 | 56.8 |
| SRTM V2 | 58.7 | 60.1 | 63.8 | 56.3 |
| SRTM V3 | 73.2 | 69.0 | 75.1 | 69.3 |
| SRTM V3 SRTMGLI | 86.9 | 81.9 | 82.6 | 82.2 |

TABLE III illustrates the benefits of building ensemble models. In some embodiments, the ensemble models may be trained to utilize the separate fire predictions of the 33 individual CNNs. FIG. 4 illustrates, for example, a logistic regression analysis for one embodiment. Hyperparemeter tuning by particle swarm optimization techniques may be performed, for example, to build an eXtreme Gradient Boosting (Xgboost) ensemble model. In one embodiment, an Xgboost ensemble model may yield the best results.

TABLE III

| Model | Accuracy (%) | Precision (%) | Recall (%) | F1 (%) |
|---|---|---|---|---|
| MODIS MOD13A2 V6 Model | 84.8 | 79.0 | 82.3 | 80.3 |
| MODIS MOD13Q1 V6 Model | 85.9 | 80.9 | 79.7 | 80.3 |
| SRTM V3 SRTMGL1 Model | 86.9 | 81.9 | 82.6 | 82.2 |
| Logistic Regression Ensemble | 92.2 | 91.0 | 87.3 | 89.0 |
| Xgboost Ensemble | 93.5 | 93.2 | 88.9 | 90.8 |

In various embodiments, a method of using an ensemble of convolutional neural networks may be used to predict wildfire ignitions. The ensemble method, for example, may achieve results that are more favorable in comparison to methods that utilize only a single source of satellite images. Based on reported performance metrics, the ensemble method may provide a reliable method for wildfire monitoring.

In various embodiments, an insight may be provided for satellite product selection for wildfire monitoring. In some embodiments, several physical properties may be significant factors for ignition of major wildfires such as topography, elevation, vegetation, and thermal anomalies.

In some embodiments, the ensemble method may require a large amount of computation. Training 33 separate CNNs, for example, may take a long time, even when done in a parallel and distributed fashion. In turn, a decent effort may be required, for example, to run the separate models on 33 different inputs, which themselves may take lengthy amount of time to obtain and preprocess. In one embodiment, only the most important features may be utilized in order to reduce computation requirements.

In various embodiments, an analysis on the dynamics of wildfire spread using satellite images and convolutional neural network may provide a promising next step. In addition, more conventional wildfire indices such as burn index or weather data such as wind speed may be included, for example, in the ensemble method to further improve accuracy of prediction.

In various embodiments of wildfire ignition, the Monitoring Trends in Burn Severity (MTBS) Burn Area Boundary and Fire Occurrence Points data sets may be used, which are maintained by United States Department of Agriculture (USDA) Forest Service. All fires reported in the MTBS project are greater than 1,000 acres in the western U.S. and greater than 500 acres in the eastern U.S. After selecting only the wildfires with eventual spread greater than 1,000 that occurred after the year 2002, we have 5,077 wildfire data points. Each data point includes geometry of wildfire spread, point of ignition, fire name, and other information. As our study concerns ignition of wildfire, the latitude and longitude of ignition point is the most important information for us.

It is our hypothesis that modern satellite imagery, which has been constantly and rapidly improved in the recent years, could produce high resolution data significantly useful for the monitoring and assessment of wildfire risk. For example, as mentioned, research has found the normalized difference vegetation index to be predictive of fuel burn propensity and near-infrared and shortwave infrared bands could capture anomalous conditions leading up to wildfires. It is important to note that the cause and effect of physical conditions around the time of wildfires could be noisy if the data is of low quality. For instance, it has been shown that a high level of regional carbonaceous aerosol could be produced by wildfires. Should we choose to use aerosol data to predict wildfire risk, we may be at risk of co-linearity.

Thus, the choice of satellite data needs to be based on either existing literature or known physical processes. Some manual data validation is also necessary to make sure that data issue is minimized.

The first research conducted utilizes the Moderate Resolution Imaging Spectroradiometer (MODIS) and Landsat imaging products from NASA. We examined a total of 294 imaging products and selected 33 of them for the initial research. The selection criteria was that the selected product is active and preferably backed by the literature. Further selection is conducted by training swarm members and excluding those that do not beat the baseline.

In terms of data processing, we crop the raw images to a grid of 50 square-miles. The collected images have time stamps at most 15 days before the ignitions for time-variant images. As some products have higher resolution than others, the dimensions of the input images are non-uniform. The NASA data come in raster band packages and could be in various different formats including .TIFF, .HDF, .GEOTIFF, and .BIL. The processing of the raster data requires the development of dedicated packages that we created in-house in the Python. To generate a grid system for the state of California, we discretize it to a system of approximately 3,300 grids of 50 square-miles. We gather all the grids in all months starting January, 2002 when MODIS was introduced. Approximately 594,000 images were collected from each satellite product. For training, we leave entire data from the years 2017 and 2018. For the rest of the data, we split the data into three sets: training, validation, and test.

The goal of various implementations is to constantly improve the quality of our models, and possibly from using more and/or better data sources. Thus, data sources are not limited to NASA data and potentially will contain proprietary data should they prove to be useful. Using multiple images for prediction is a computationally complicated task. An image alone requires large memory space and thus the model requires a scalable architecture, which is the topic of the following section.

The training of a CNN model is done in batches, whose size is often a power of two that is greater than or equals to eight. A big batch size fares worse in generalization whereas a small batch size takes longer for the model to train. It follows that storing multiple satellite images per data point requires huge memory capacity. This memory constraint explains the dearth of research in using multiple different images to classify one object.

Furthermore, a CNN's weight parameters also require significant amount of memory. A ResNet-50 model requires around 168 MB to store its parameters. A large horizontal system of 10 ResNet-50 stacked side by side, consuming 10 image data inputs, and connected by the final few layers requires at least 1.6 GB for the parameters alone. Training such a network is slow, and feature validation cannot be done in a straightforward manner. Should the training data set expand, the training cannot be done without retraining the entire large model again, leading to scalability issue. We tested with these methods using a subset of our data on a 16 GB Nvidia Tesla P100 GPU on Google Cloud. Convergence took 13 days for 10 input images and 1,000 images per satellite product when we used ResNet-50 architecture. Using a simpler architecture like LeNet-5 shortens training time at an expense of model performance.

To design a scalable system that is flexible for input addition and transparent in feature significance, various implementations include a swarm neural network system. In our design, a satellite CNN model acts as a swarm member (expert) and uses a unique source of data input to predict the same target: wildfire ignition. Similar to a swarm intelligence decision network, each swarm member is an expert in its subject, which is known to be predictive of wildfire propensity. For instance, the NVDI CNN model trains using NVDI satellite images to predict wildfire and the Elevation model trains using Topological map to predict the very same target. Eventually, model outputs are combined to predict an eventual wildfire signal.

It is important to note that our architecture is different from model stacking, which is done by training different models of different parameters using the same input data and ensemble their predictions using another model. We can indeed experiment model stacking with the swarm members' predictions to improve performance metrics, noting that overfitting is prone to happen as model complexity increases. In a simulation scheme that uses ignition probability generated from a model, overfitting could negatively affect accuracy by the model generating too many probability predictions close to 0 and 1, thus creating polarizing predictions.

To train each swarm member, we need a possibly non-unique CNN architecture for each of them that would optimize the performance metrics, which we choose to be F-1 score with heavier weight on recall. The reason for this choice of metrics comes from the nature of risk estimation. A false negative is the costliest error in the estimation of catastrophic risk, and thus recall or an F-1 with heavier weight on recall is a natural choice. Now, for the swarm members, it's viable that we create n swarm members using n different CNN architectures on one source of satellite images. This method would work well and without bias if the n models don't produce exactly the same predictions given the same inputs. For our ignition model, we use neural architecture search, whose details can be found above, for each swarm member CNN architecture.

In order to be selected as a swarm member, the individual CNN models need to outperform the baseline. Since ours is a binary classification problem where a simple coin toss would yield 50% accuracy, precision, and recall, this could serve as the baseline. For a model in production, we could raise the criteria for selection to be stricter or include the members' own performance metrics in the final ensemble model to create a bias leaning towards swarm members with higher predictive power. This method is analogous to creating a diversified financial portfolio with more weights in mutual funds with higher past returns.

From this result, we could generate training and testing sets for ensemble training using the probability produced by the trained models. Note that the initial training, validation, and testing data split must remain the same across location and time throughout all satellite products to avoid training bias. There are several ways to attain the final prediction and ignition probability from the swarm members' prediction. For example, we could build an ensemble model, perform averaging or weighted averaging by each individual's performance, or fit a logistic regression to calculate each individual's respective coefficient. We are currently creating a swarm intelligence decision network using the Leaky Competing Accumulator (LCA), discussed above, for the final ignition prediction.

In this section, we introduce the architecture and present the experimental results of an embodiment of a swarm expert network system. The test result appears favorable, suggesting that the probabilities produced by the swarm system could be used for wildfire risk estimation. The key of this embodiment is in using separate CNN models to train on the same target and then aggregate the model predictions for the final prediction. This embodiment may be referred to as a Swarm Neural Network system as each model could be viewed as an expert in its own field and contribute its prediction to the swarm to make the final decision. Now, the swarm size could grow further as we add more data sets without problems. Our system allows the swarm size to be extremely large and would still scale robustly, even when input data are satellite images, which are known to be large and require significant memory to train.

As mentioned, a false negative is the most important metric for the model to minimize, hence as a risk estimation system, the embodiment Swarm Network leans towards the conservative polar. We should remind the readers the fact established above that the majority of wildfire ignitions are caused by lightning strikes, which are governed by a large degree of randomness. It follows that wildfire potential and actual ignition, though very closely correlated, are not perfectly positively correlated. A major wildfire always ignites at a location with positive wildfire potential, while the reverse is not guaranteed. Therefore, a simulation is necessary in order to create an accurate risk estimation.

Now, because of the inherent randomness in actual wildfire ignitions, the most prevalent issue we face during training is false positive. For example, a location might have similar, if not identical, wildfire potential in July and August, but wildfire only occur in one of these two cases. The same logic could be applied for two neighbor locations in a same time period. Furthermore, adding a month variable and/or direct location variables such as latitude and longitude directly to the Swarm Neural Network could help with false positive issues at a cost of bias, which we try to avoid. It follows that during training, we needed to either (1) leave non-fire data with high wildfire potential unlabeled and add labels using iteratively trained models or (2) exclude them. We tested with both methods and the converged model weights were largely similar.

It is a well-known fact in machine learning that model implementation often meets unexpected problems in practice. Such problems can come from data issues, inconsistent prediction results, or overfitting when completely new data is observed. By using satellite imagery, we face a problem of cloud cover in production. Thus, we need to use data from days before the requested date or data interpolation when data from prior dates were also unusable. Inconsistent results could be checked manually by logging models' prediction by using production code. Lastly, overfitting is potentially harmful to our system if the model fails to accurately assess the wildfire risk at locations where actual major wildfire ignites. Due to data limitations (i.e., we can only train with what has happened), this type of overfitting is often difficult to catch in training. To overcome this issue, we track all on going wildfires and cross validate with our assessment to make necessary ongoing adjustments to the models.

As discussed above, the Huygen's principles, when incorporated with the Rothermel wildfire model, provide a good way to estimate the growth and spread of wildfires. Using this foundation, FarSite and other software have been useful in wildfire spread estimation in practice. However, such software packages often have major computational performance issues. First, the input data space is large, with each input variable requiring tedious manual data preparation and pre-processing. Second, the run time for one wildfire spread estimation spans hours. These computational issues suggest that the existing wildfire spread software are not quite suitable for use in the context of re/insurance catastrophe simulation, in which the number of simulations can go well into the hundreds of thousands or millions, each with possibly tens of major wildfires.

Consequently, various implementations disclosed herein generate a wildfire spread model to simulate wildfire spread efficiently while still capturing the essence of Huygen's principles and the wildfire factors found in the Rothermel model. Summarily, we accomplish this by performing a series of experiments, which are similar to the nature of Rothermel's original closed-environment experiments, on historical wildfire spread data and build models to estimate wildfire rate of spread in the fire-front direction. The relationships between fire-front and fire-flank rates of spread and between fire-front and fire-rear rates of spread are found by optimization techniques that identify the constants that best fit actual historical wildfire spreads.

The input space to various implementations of wildfire spread is much simpler than those of other wildfire spread software as it only consists of (1) weather parameters: temperature, wind speed, wind direction, and precipitation, and (2) location-specific wildfire potentials that are calibrated by various implementations of swarm neural network system. Various implementations of wildfire spread models have an approximate 0.7 mile resolution (0.01 degree of latitude and longitude), which discretizes the state of California into 0.5 mile square grids. It follows that horizontal and vertical wildfire spreads (North, East, South, West directions) from and to centers of each grid are in a 0.7 mile discretization, whereas diagonal spreads (North-East, North-West, South-East, South-West directions) are in a 1 mile discretization by the Pythagoras theorem.

We use the Monitoring trends and burn severity (MTBS) data for the development of our wildfire spread model. The total time burn data is important for the calculation of hourly rates of spread for training while the eventual spread area data is used for the calculation of spread distance. Now, Rothermel states that wildfire spread areas, in controlled environments, are theoretically ellipses. Since real life is far from theory and the environments are uncontrollable, wildfire shapes in the MTBS data are not perfect ellipses. Fortunately, it is a simple mathematical task to construct an ellipse that covers any wildfire spread shape as an elliptical approximation for our experiments. Hence, it is straightforward to define the elliptical dimensions of each wildfire and approximate the distance and constant rate of spread from MTBS data.

The MTBS data, though arguably the best wildfire spread data set in existence, suffer from several data issues. First, the wildfire ignition field contains a high degree of noise. For many data points, the ignition locations are not in the spread area entirely. We overcome this issue by re-allocating the erroneous ignition points to the theoretical ignition points, which is around 25% the length of the major axis of the ellipse against the direction of the dominant wind direction. Moreover, containment time also contains significant inaccuracies, as some wildfires are recorded in the MTBS data to last more than six months. We fix this data issue by both manually fixing these errors and regressing hours burned against fire size and then use the regression model to provide a reasonable estimation for those cannot be found.

For weather data, we use the Global Historical Climatology Network (GHCN) data that is published by the National Oceanic and Atmospheric Administration (NOAA). The data set contains daily temperature, wind, snow, precipitation, and other weather statistics measured and recorded at weather stations all over the globe. We use interpolation techniques to estimate the data between the weather stations.

The first step we perform is adding some variance to the assumed constant rate of spread that could be retrieved from wildfire burn data. The constant rate of spread could be found by dividing spread distance along the major elliptic axis by total time burn. It is a valid assumption that the rates of spread of a wildfire are not constant but a function of location and weather condition, and the variance in rates of spread is directly proportional to duration of burn and wildfire size. The variance is added in an iterative manner using regression; and the final regression model is the model to be used in rate of spread prediction. The training algorithm is illustrated in FIG. 3B.

The added noise model takes advantage of the fact that the distribution of spread is significantly positively skewed, a phenomenon often faced in dealing with catastrophe size and damage. Wildfire potential for each 0.5-mile square is obtained by multiplying the ignition probability predicted by the swarm neural network model in section 5 by a weighted historical ignition probability of the respective grid inside the encompassing 50-mile square grid. For 0.5-mile square grids without historical ignition data, interpolation is used. The method used to obtain weather data at each grid during each day of wildfire can be found in the previous subsection and we assume that all grids stop burning in less than 72 hours. We assume constant rates of spread to obtain the appropriate time-related regional weather data. The final OLS result is shown in FIG. 3C.

Satisfactory $R^2$ and low p values indicate that the model reflects well the variance in wildfire rate of spread. Recall that the trained data is generated data, and thus the model is not free from bias. However, it is more realistic than assuming that rate of spread is constant across time and location. The model does so by utilizing the fire potential data of each small 0.5 mile-square grid as well as varying weather conditions. The higher n is, the more bias is added and thus we can observe a gradual increase in $R^2$, which starts at 0.54 in the first iteration. The above result is obtained when n=10, which is the number we find to provide enough variance in predicted rate of spread while limiting the bias.

The rate of spread we obtain by the regression model is the flaming front rate of spread, which burns in the direction of the dominant wind. Now, the task remains that we need to optimize for the relative rate of spread at the flanks and rear of wildfires. There exists a simple yet relatively reliable linear relation between the flaming front rate of spread and other relative spread directions: rate of spread would be 20% at the flank, 74% at the hank (45-degree relative spread direction), and 5% at the rear of the fire. BehavePlus, a well-known wildfire modeling software applies this linear relationship. While it is possible to assume these relationships for our wildfire spread model, we reconduct Rothermel's closed environment experiments with our data to observe and optimize for these constant coefficients. Since we are using a grid system to discretize space for computational performance, there might exist a set of parameters that yield better spread estimation than those mentioned earlier. Our wildfire spread algorithm is illustrated in Algorithm 5 of FIG. 3D.

For the sake of clarity, some definitions are needed for Algorithm 5. A fire vertex is defined as the center of a wildfire grid, j is the time at the point of view of a specific fire vertex, and started at the moment it was initialized, and s is the distance to the next vertex in the direction of the dominant wind. For example, if the rate of spread is 0.1 miles per hour, then if the dominant wind blowing North, then it takes 0.7/0.1=7 hours for the wildfire to spread to the next vertex. However, if the wind is blowing North-East, then now the distance is $\sqrt{(0.7^2+0.7^2)}\approx 1$, and thus it takes 10 hours for the wildfire to spread to the next vertex. A new vertex is defined as a vertex that is not in the list of active vertices, passive vertices, or burned vertices. And in the foreach loop for each passive vertex, we use shorthand notations to describe the spreads to non-front vertices instead of writing three separate processes of spreading to the hank, flank, and rear of the fire vertex. Lastly, it is worth noticing that in this algorithm, all vertices start by being an active vertex, then spread fire to the next vertices in the direction of the dominant wind, then become passive vertices, during which they burn the hank, flank, and rear respectively, and eventually become burned vertices.

It is now straightforward to optimize for the constant coefficients that would yield the best result for Algorithm 4 in an experiment using historical spread area. Similar to Rothermel's closed environment experiment to measure relative rates of spread, we run Algorithm 4 on historical wildfires from MTBS data with different sets of reasonable coefficients to identify the one that yields the best fit. Mathematically, we optimize $f(\alpha, \beta, \delta)$ that maximizes our metrics of choice. In this notation, $\alpha$ is the hank-to-front relative coefficient, $\beta$ is the flank-to-front relative coefficient, and $\delta$ is the rear-to-front relative coefficient. The most appropriate metric to use is intersection over union, also known as Jaccard index, which can be found by:

$$J(A, B) = \frac{|A \cap B|}{|A \cup B|} = \frac{|A \cap B|}{|A| + |B| - |A \cap B|} \tag{34}$$

The optimal parameters for Algorithm 4 are found to be $\alpha$=25%, $\beta$=12.5%, and $\delta$=6.25%. Remark that for the elliptical assumption to work, weather data is kept constant for this optimization task.

In this section, construction of various implementations of a wildfire spread model are presented, which follows theoretical and experimental results from the literature and extends these studies by using the combination of weather data and wildfire potential variables produced by implementations of a swarm neural network. As a result, various implementations of wildfire spread models may be efficient and robust, and may simulate wildfires that burn up to 300,000 acres in less than a minute while still maintaining realistic properties of wildfire spread. With these advantages, various implementations of wildfire spread model as disclosed herein may be suitable for application in sophisticated simulation-based scheme that generates a large number of simulations.

To estimate rates of spread and relationships between the spread rate at the front and hank, flank, and rear of a wildfire, we fit iterative regression models and subsequently perform optimization on our own algorithmic wildfire spread framework. We use MTBS data, which understandably contains a significant amount of noise due to the difficulty of accurately recording data that inherently contains a high degree of randomness. Hence, some data cleaning and workarounds are necessary for noise reduction and re-adjusting the historical wildfires to follow classical physical assumptions.

Various implementations of wildfire spread model as disclosed herein are quasi-physical models that include physical, mathematical, and algorithmic components. Our assumptions behind the patterns and determinants of wildfire spread are physical and follow classical wildfire theories. Historical wildfires are adjusted to have an elliptical shape for training, and ignition points are fitted to follow the physical assumption of wildfire spread patterns. Unlike purely physical models, we use a mathematical model, the Kettle swarm neural network, to generate the wildfire potentials to be used as an input for the estimation of rates of spread, which is also a product of statistical methods i.e. a machine learning model. The algorithmic component of the Kettle wildfire spread model comes into play by the discretization of geographical regions and by the algorithmic method with which wildfire spread takes place. This algorithmic approach allows the Kettle wildfire spread model to perform efficiently and robustly.

During our experiment, we keep the weather conditions constant for the optimization of parameters for Algorithm 5, allowing the experiment to follow the classical close-environment experimental framework. During the process of constructing bounding ellipses around wildfires, we notice that for smaller wildfires that do not burn for an extended amount of time, the bounding ellipses provide an impressive approximation. It follows that if the time burn data and weather data are free from noise, we could find parameters for Algorithm 5 that would generate discretized wildfire ellipses that almost completely match the wildfires' bounding ellipses.

Unfortunately, as mentioned, both wildfire spread data and weather data are rather noisy. While this represents an obstacle, the Kettle wildfire spread model is still able to deliver the optimal results for the experimental setting, which is similar to how classical wildfire models were studied. The mentioned noise, however, prevents us from providing a valid and reliable performance metrics in terms of predicting the actual wildfire spread besides the maximized Jaccard index produced by Algorithm 5 when the optimal parameters are used in the experimental environment. During simulation, the Kettle wildfire risk estimation engine, which is the next topic of discussion, uses variable weather data, and thus captures more reality than the training result in experimental environments.

Various implementations of a Swarm Neural Network system as described above may be used to create a wildfire ignition risk map, which could be used as a great proxy for wildfire exposure risk given its performance metrics. However, at a 50 square mile resolution, the granularity of this risk assessment is not high enough according to various standards as it is our goal to assess every property at the highest accuracy. Thus, we develop a simulation engine that simulates wildfire ignitions and consequentially emulates their spread using the spread model outlined herein at a 0.5-mile square resolution to enhance the level of granularity and accuracy.

Moreover, in re/insurance, it is essential to have a list of possible scenarios given regional probabilities of risk for the purpose of pricing and risk hedging. By simulating many scenarios, some of them will be close to the eventual real-life outcome. In addition, an insurance portfolio often spans one year and includes properties spread throughout different regions. Since property portfolios are unique in their composition, it is necessary to acquire the distribution of potential losses specifically for the portfolio under analysis. The average exposure of any property portfolio could be obtained by a simple risk/ignition probability map, but the case is not true for analytics at 90%, 95%, or 99% tails of the loss distribution. In various implementations, we need superior granularity and confidence in the loss distribution estimation.

Often, the higher number of simulations, the closer the generated loss distribution approaches the actual loss distribution. This is analogous to a numerical scheme that converges closer to true solutions when the number of discretized steps is higher. Moreover, there is a parallelism from our scheme to a MCMC algorithm, although obtaining an analytical proof and order of convergence for our simulation scheme would be challenging considering its many separate components. For this analysis, we produce a large n number of simulations and perform sampling for $m<n$ to analyze convergence order as m increases.

As mentioned, Algorithm 2 in FIG. 1I can be enhanced to improve its accuracy, realism, and computational performance. For instance, randomizing wildfire size leads to overestimation of risk in areas that could not be affected by wildfire. Additionally, using an overly computationally heavy algorithm such as the Farsite algorithm would hamper the performance of the simulation engine when we perform thousands and millions of simulations. Thus, we implement the ignition potential derived from the Kettle swarm neural network for ignition prediction and the Kettle spread model disclosed above to Algorithm 2. The Kettle wildfire risk estimation engine targets to be the state-of-the-art algorithm in wildfire risk estimation for the purpose of re/insurance.

Disclosed herein is pseudo-code without detailed programmatical components. The detailed objects (classes) developed for the simulation scheme are:

Wildfire vertex: all unique locations on Earth can be represented by their latitudes and longitudes. Each of them is linked to several neighbor vertices, which a wildfire can spread. Each vertex also has its own physical characteristics such as elevation, temperature, precipitation, and wind speed. and statistical characteristics such as historical frequency of fire ignition. The rounding of latitudes and longitudes determines the level of resolution of the simulation scheme.

Wildfire: a wildfire is composed of a set of affected vertices. Areas of effect and transition probabilities are more efficiently computed using this object in comparison to using each vertex object. The wildfire object is also responsible for updating relevant vertices' properties. This object, if sophisticated enough, could be used for live prediction of catastrophes. Accuracy and speed are in an inverse relationship for a simulation scheme; hence we need to find a balance between the two to optimize efficiency depending on the application.

Wildfire simulator: the simulator contains wildfire potentials of all grids in California. The simulator object, using a random number generator, simulates the ignition location of a wildfire, which becomes active until it is over. The simulator keeps track of the number of occurred wildfires in each simulation scenario, records the affected locations, and adjusts wildfires potentials at those locations as the scenario evolves. For example, when a major wildfire happens at a location in May, the location's wildfire propensity will be reduced significantly for the months afterwards in that scenario.

State space simulator: there are two choices with respect to simulating the physical properties at time t for every grid. One is sampling from historical periodic rate of change dt or forecasting an interval and sample from this interval. For image inputs, sampling from historical periodic rate of change is more practical as the data are represented by pixels. For properties such as wind speed, temperature, precipitation, and number of wildfires, a forecast could yield realistic results. Note that we need to also inspect the level of correlation among the physical variables or assume that they are independent of each other.

Summarily, for each simulation, we initialize a wildfire simulator. Then, we generate the state space for the next twelve months using initial real-life conditions. The simulator samples each month's number of wildfires using a forecast model and subsequently simulates ignitions using the wildfire potential generated by the Swarm Neural Network ignition model. For each ignition, we use the spread model to simulate the spread from the ignition location and keep record of all affected 0.5-mile square grids. For each affected grid, the wildfire simulator adjusts properties that are drastically changed by wildfires, such as vegetation index, to reflect the effects of the burn. It also adjusts the corresponding wildfire potentials following the change in these changed properties. Each simulation ends when it completes the twelve months forward simulation. The returned result comprises a list of grids affected by wildfire. Aggregating the results of thousands and millions of these wildfire simulations provides us an estimation of wildfire risk associated in a small region.

Various implementations of a wildfire risk estimation system as disclosed herein may utilize Algorithm 6, as illustrated in FIG. 3E, where the procedure to run an ignition model and a spread model may be inferred from various sections above, including the section regarding simulation components. Now, given a portfolio of properties, the output obtained from Algorithm 3 may be used to assess the risk of the portfolio using Algorithm 7, as illustrated in FIG. 3F.

There are several ways to estimate each affected property's loss if it is in a grid affected by wildfire. Data shows that for historic wildfires that spread more than 20,000 acres, most properties located close to center of the spread zone are completely destroyed while properties near the spread boundary are found to suffer less damage. It follows that we could develop a regression model that predicts the rate of destruction using distance from boundary of spread and eventual size of wildfires. For simplicity, one could use a constant severity rate that reflects the average of wildfire damage.

While there are straightforward ways to measure the performance of each separate component that makes up the Kettle wildfire risk estimation engine as disclosed herein, e.g., using training-testing splits and optimizing for the metrics of choice, the same cannot be said for a test for the system as a whole. For this purpose, we leave out the entire 2017 wildfire season to test the result obtained from the simulation scheme.

There are several details to note to interpret these results. First, we know that the 2017 wildfire season is one among the many different possibilities that could happen, meaning if multiple universes existed, in those universes the 2017 wildfire season could look very different. A major reason for this is due to the random nature of actual wildfire ignition. Thus, high precision is extremely difficult to obtain in the context of simulation, implying that some zones with high probability may not experience a major wildfire. In the context of simulation for risk estimation purposes, recall is a better metric of choice. In our test, all areas where wildfires have high positive wildfire involvement probabilities, ensuring that our system is conservative enough.

Now, low precision becomes a problem when a realistically safe area is associated with a high probability of wildfire involvement. In this case, homes that are actually safe from a wildfire risk perspective are punished in the context of insurance pricing. That said, fixing for low precision is markedly easier. We use population density and extreme low values in vegetation to increase precision post-simulation.

As disclosed herein, various implementations of wildfire ignition models involve machine learning models using satellite imagery data, climate model data, regional reanalysis data, anthropogenic data, and other general earth science data. Such wildfire ignition models may be based on various machine learning algorithms and techniques. In some implementations, a boosting algorithm and a swarm neural network may be utilized. In one example, a boosting algorithm may be trained on the various input data using hyperparameter tuning and iterative training. In another example, a swarm neural network may involve transforming data into pixelated format, and training convolutional neural networks to process and generate signals from each individual feature.

As disclosed herein, various implementations of wildfire spread models may include training two separate spread models to achieve a local high resolution scale. In some implementations, a cellular model may predict the rate of spread in the direction of the wind. For example, the algorithms may simulate wildfire movements at a cellular level. In this example, each cell may be an object and through each iteration, the spread model may evaluate and compute the time taken for wildfire spread to traverse to 8 neighboring cells. In some implementations, a deep convolutional neural network model may treat each grid cell as a pixel in an image. For example, input data may be overlaid, and the final predicted fire perimeters may be computed using the predicted probabilities that each pixel is affected by wildfire.

In various implementations, a simulation pipeline may be highly customized for the purpose of reinsurance risk assessment. Understanding the reinsurance loss calculation requirements may help with the understanding of the uniqueness of various implementations described herein. Various implementations may contain simulated years, wildfire shape, and fire weather conditions. Simulated years, for example, may include simulating a large number of potential scenarios that could happen in California, given the generated set of climate scenarios, random lightning events, random human actions, and the like. As each simulated year represents a possible wildfire situation, a loss distribution may be developed from the simulated year to estimate wildfire risk to properties in California and properties in an insurance portfolio. Wildfire shape, fire intensity, fire size, fire duration, and other fire statistics may be needed, for example, in order to perform damage estimation and loss distribution calculation. Fire weather condition, for example, may enable tracking and management, as an actual year progresses, of the actual potential distribution of risk in order to perform risk assessment.

Various implementations, as disclosed herein, randomly generate realistic world conditions/scenarios that capture human behaviors and climate conditions, generate ignition points, predict fire spread based on ignition points and local conditions, enable reinsurance pricing, use probability of burn and simulated wildfire to price individual home premium with Dutch-auction style and price surging, utilize swarm optimization for portfolio construction, and provide a simpler parametric product based on high resolution burn probability. For example, models may be trained to predict potential points of wildfire ignitions based on historical events such as the severity of thunderstorms and random arson events. This is in contrast to models that only overlay wildfires to predict probabilities.

In some implementations, randomly generated data may be used to predict fire ignition probability and simulate random ignitions based on relative risk. In some implementations, wildfire may be computed in under a second, which may enable simulation of millions of wildfire shapes for reinsurance risk estimation. In some implementations, generated wildfires and generated conditions may be used to obtain a distribution of risk. For example, a probability of ignition and wildfire spread may be obtained for every 1 km grid square in California.

The risk determined for a particular location may be used to inform other analyses of interest. For example, insurance premiums for each home with Dutch-auction style and price surging may be priced, for example, using a calculated probability of burn and simulated wildfire behavior. This may enable underwriting a risk attaching QS insurance product. For example, if a new submission creates diversification based on a location in a region where a portfolio does not have any existing policy, then the home may receive a discount. In contrast, if the new submission is in an area where a portfolio already has some concentration, the a probable max loss curve may be computed using simulated wildfires and a tail loss of the portfolio may be found with and without the home, and a surging function may be used to compute a penalty charge for the premium for the home.

In some implementations, a wildfire carveout from a cat reinsurance placement may be created. For example, given a large book of properties, a subset of homes may be selected that minimize/maximize an objective function, which could be maximum geographical spread or minimum variance, under a set of constraints. Given that a home may only be rejected/accepted, i.e. no fractions are allowed, the solution space may be vectors of eigenbasis. In this example, optimization for highly non-linear and non-differentiable objective functions under non-linear constraints may be performed. As an example, a tail-risk constraint, such as $100 million loss at the 1 in 100 tail event, may be imposed.

Figure 5:
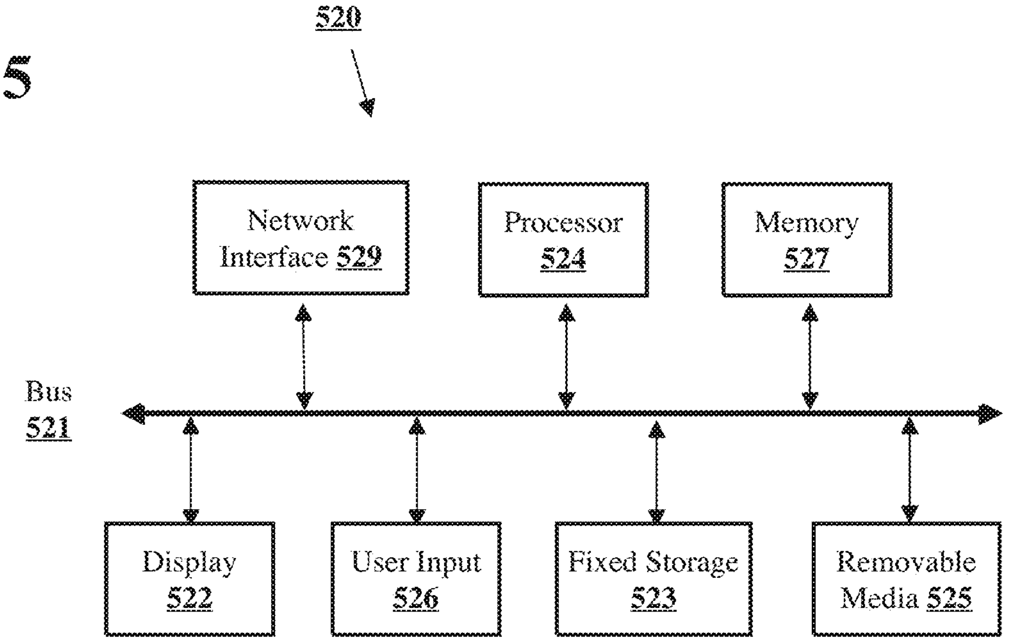
FIG. 5 shows a computing device according to an embodiment of the disclosed subject matter.

Embodiments of the presently disclosed subject matter may be implemented in and used with a variety of components and network architectures. FIG. 5 is an example computing device 520 suitable for implementing embodiments of the presently disclosed subject matter. The device 520 may be, for example, a desktop or laptop computer, or a mobile computing device such as a smart phone, tablet, or the like. The device 520 may include a bus 521 which interconnects major components of the computer 520, such as a central processor 524, a memory 527 such as Random Access Memory (RAM), Read Only Memory (ROM), flash RAM, or the like, a user display 522 such as a display screen, a user input interface 526, which may include one or more controllers and associated user input devices such as a keyboard, mouse, touch screen, and the like, a fixed storage 523 such as a hard drive, flash storage, and the like, a removable media component 525 operative to control and receive an optical disk, flash drive, and the like, and a network interface 529 operable to communicate with one or more remote devices via a suitable network connection.

The bus 521 allows data communication between the central processor 524 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 520 are generally stored on and accessed via a computer readable medium, such as a hard disk drive (e.g., fixed storage 523), an optical drive, floppy disk, or other storage medium.

The fixed storage 523 may be integral with the computer 520 or may be separate and accessed through other interfaces. The network interface 529 may provide a direct connection to a remote server via a wired or wireless connection. The network interface 529 may provide such connection using any suitable technique and protocol as will be readily understood by one of skill in the art, including digital cellular telephone, WiFi, Bluetooth®, near-field, and the like. For example, the network interface 529 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 527, fixed storage 523, removable media 525, or on a remote storage location.

Figure 6:
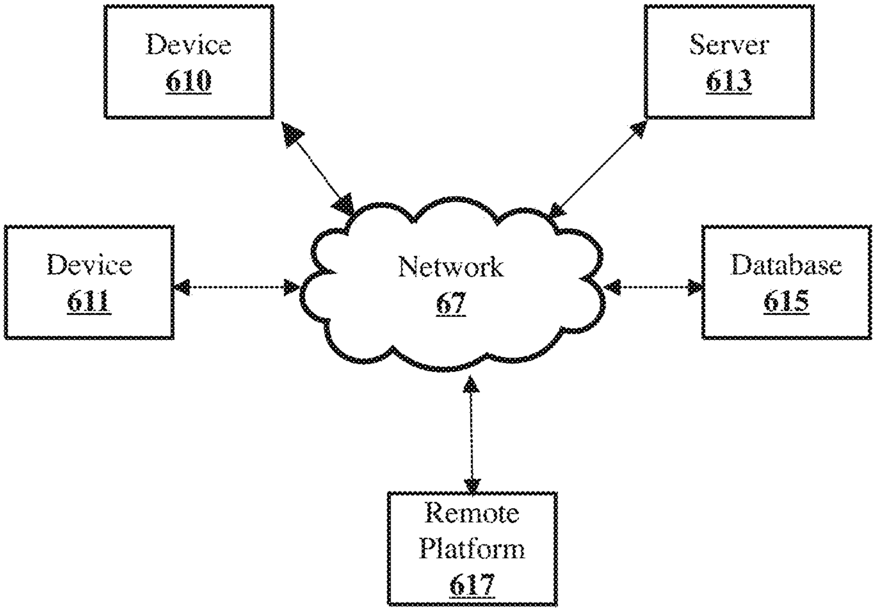
FIG. 6 shows a network configuration according to an embodiment of the disclosed subject matter.

FIG. 6 shows an example network arrangement according to an embodiment of the disclosed subject matter. One or more devices 610, 611, such as local computers, smart phones, tablet computing devices, and the like may connect to other devices via one or more networks 67. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 613 and/or databases 615. The remote devices may be directly accessible by the devices 610, 611, or one or more other devices may provide intermediary access such as where a server 613 provides access to resources stored in a database 615. The devices 610, 611 also may access remote platforms 617 or services provided by remote platforms 617 such as cloud computing arrangements and services. The remote platform 617 may include one or more servers 613 and/or databases 615.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

Generally, embodiments described herein may be utilized to perform prediction of ignition and/or spread of wildfires. In further embodiments, as described in greater detail in the accompanying white paper, predicted wildfire ignition and/or wildfire spread may be utilized to price and/or otherwise influence reinsurance services and/or offerings, or to perform any other analysis or take any other action that may use the assessment of such risk(s) as a contributing factor. The embodiments disclosed in the attached appendix are illustrative of the invention and are not provided as limitations on the scope or content of the invention disclosed herein. The specific techniques disclosed herein and in the attached appendix may be used in any desired combination, and may use alternate techniques instead of, or in addition to, those disclosed herein. Furthermore, the techniques, systems, and arrangements disclosed in the attached appendix also may be adapted to similarly predict the occurrence of other natural phenomena, such as floods, hurricanes and other severe storms, and the like, by using corresponding data sources and techniques, as previously disclosed herein.

What is claimed is:

1. A computer-implemented method comprising:

generating a proposal for a plurality of convolutional neural networks (CNNs);

training the plurality of CNNs to predict a wildfire spread risk at a geographic location to produce a plurality of trained CNNs, each CNN being trained on a data set that is unique from each other data set used to train each other CNN of the plurality of CNNs;

determining an accuracy metric from each of the trained CNNs of the plurality of trained CNNs; and performing a reinforcement learning task for each trained CNN using the accuracy metric for the trained CNN to produce a swarm expert network system comprising a set of the trained CNNs that outperform a baseline prediction threshold;

generating a wildfire spread risk for the geographic region using the swarm expert network system; and based upon the wildfire spread risk for the geographic region, predicting a risk of loss of a physical asset located within the geographic region.

2. The computer-implemented method of claim 1, wherein a controller RNN predicts a filter height, a filter width, a stride height, a stride width, and a number of filters for a layer of the plurality of CNNs.

3. The method of claim 1, wherein each data set comprises data representative of a different metric than each other data set, which is known to be predictive of wildfire propensity.

4. The method of claim 1, wherein the baseline prediction threshold is 50% accuracy, precision, and/or recall.

5. The method of claim 1, wherein at least one of the data sets comprises data cross-referenced from a plurality of reporting agencies to produce combined fire progression data.

6. The computer-implemented method of claim 1, wherein the physical asset comprises a property portfolio comprising multiple properties located in the geographic region.

7. A non-transitory machine-readable storage medium that provides instructions that, when executed by a processor, cause the processor to perform operations comprising:

generating a proposal for a plurality of CNNs;

training the plurality of CNNs to predict a wildfire spread risk at a geographic location to produce a plurality of trained CNNs, each CNN being trained on a data set that is unique from each other data set used to train each other CNN of the plurality of CNNs;

determining an accuracy metric from each of the trained CNNs of the plurality of trained CNNs;

performing a reinforcement learning task for each trained CNN using the accuracy metric for the each trained CNN to produce a swarm expert network system comprising a set of the trained CNNs that outperform a baseline prediction threshold;

generating a wildfire spread risk for the geographic region using the swarm expert network system; and based upon the wildfire spread risk for the geographic region, predicting a risk of loss of a physical asset located within the geographic region.

8. The non-transitory machine-readable storage medium of claim 7, wherein a controller RNN predicts a filter height, a filter width, a stride height, a stride width, and a number of filters for a layer of CNNs.

9. The non-transitory machine-readable storage medium of claim 7, wherein the physical asset comprises a property portfolio comprising multiple properties located in the geographic region.

10. The non-transitory machine-readable storage medium of claim 7, wherein each data set comprises data representative of a different metric than each other data set, which is known to be predictive of wildfire propensity.

11. The non-transitory machine-readable storage medium of claim 7, wherein the baseline prediction threshold is 50% accuracy, precision, and/or recall.

12. The non-transitory machine-readable storage medium of claim 7, wherein at least one of the data sets comprises data cross-referenced from a plurality of reporting agencies to produce combined fire progression data.

13. An apparatus comprising:

a processor; and a non-transitory machine-readable storage medium that provides instructions that, when executed by a processor, cause the processor to perform operations comprising:

generating a proposal for a plurality of CNNs;

training the plurality of CNNs to predict a wildfire spread risk at a geographic location to produce a plurality of trained CNNs, each CNN being trained on a data set that is unique from each other data set used to train each other CNN of the plurality of CNNs;

determining an accuracy metric from each of the trained CNNs of the plurality of trained CNNs;

performing a reinforcement learning task for each trained CNN using the accuracy metric for the each trained CNN to produce a swarm expert network system comprising a set of the trained CNNs that outperform a baseline prediction threshold;

generating a wildfire ignition risk for the geographic region using the swarm expert network system; and based upon the wildfire ignition risk for the geographic region, predicting a risk of loss of a physical asset located within the geographic region.

14. The apparatus of claim 13, wherein a controller RNN predicts a filter height, a filter width, a stride height, a stride width, and a number of filters for a layer of CNNs.

15. The apparatus of claim 13, wherein the physical asset comprises a property portfolio comprising multiple properties located the geographic region.

16. The apparatus of claim 13, wherein each data set comprises data representative of a different metric than each other data set, which is known to be predictive of wildfire propensity.

17. The apparatus of claim 13, wherein the baseline prediction threshold is 50% accuracy, precision, and/or recall.

18. The apparatus of claim 13, wherein at least one of the data sets comprises data cross-referenced from a plurality of reporting agencies to produce combined fire progression data.

* * * * *